US012377666B2

(12) United States Patent
Yamada

(10) Patent No.: US 12,377,666 B2
(45) Date of Patent: Aug. 5, 2025

(54) STORAGE MEDIUM STORING PROGRAM, INFORMATION PROCESSING APPARATUS, AND CONTROL METHOD

(71) Applicant: CANON KABUSHIKI KAISHA, Tokyo (JP)

(72) Inventor: Ruriko Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 18/360,058

(22) Filed: Jul. 27, 2023

(65) Prior Publication Data

US 2024/0075755 A1 Mar. 7, 2024

(30) Foreign Application Priority Data

Sep. 1, 2022 (JP) .................................. 2022-139344

(51) Int. Cl.
*H04N 1/04* (2006.01)
*B41J 11/00* (2006.01)
*H04N 1/387* (2006.01)

(52) U.S. Cl.
CPC ........ *B41J 11/0065* (2013.01); *H04N 1/3875* (2013.01)

(58) Field of Classification Search
None
See application file for complete search history.

(56) References Cited

U.S. PATENT DOCUMENTS 7,307,745 B2    12/2007   Tanaka
2003/0137691 A1  7/2003   Tanaka
2024/0075755 A1*  3/2024  Yamada ............... B41J 11/0065

FOREIGN PATENT DOCUMENTS

JP         2003-216366 A       7/2003

\* cited by examiner

*Primary Examiner* — Cheukfan Lee
(74) *Attorney, Agent, or Firm* — Venable LLP

(57) ABSTRACT

Re-layout processing of the one or more objects is executed when an instruction for a re-layout for borderless printing of one or more objects included in a page that can be printed by a printing apparatus is received. The re-layout processing includes at least processing to scale down a predetermined object that does not satisfy a predetermined condition relative to a background object so that, for objects other than the background object from among the one or more objects, an object that satisfies the predetermined condition is allowed to extend into, from among a printable region and an extend region in the page in a case of borderless printing, the extend region and an object that does not satisfy the predetermined condition is not allowed to extend into the extend region.

15 Claims, 20 Drawing Sheets

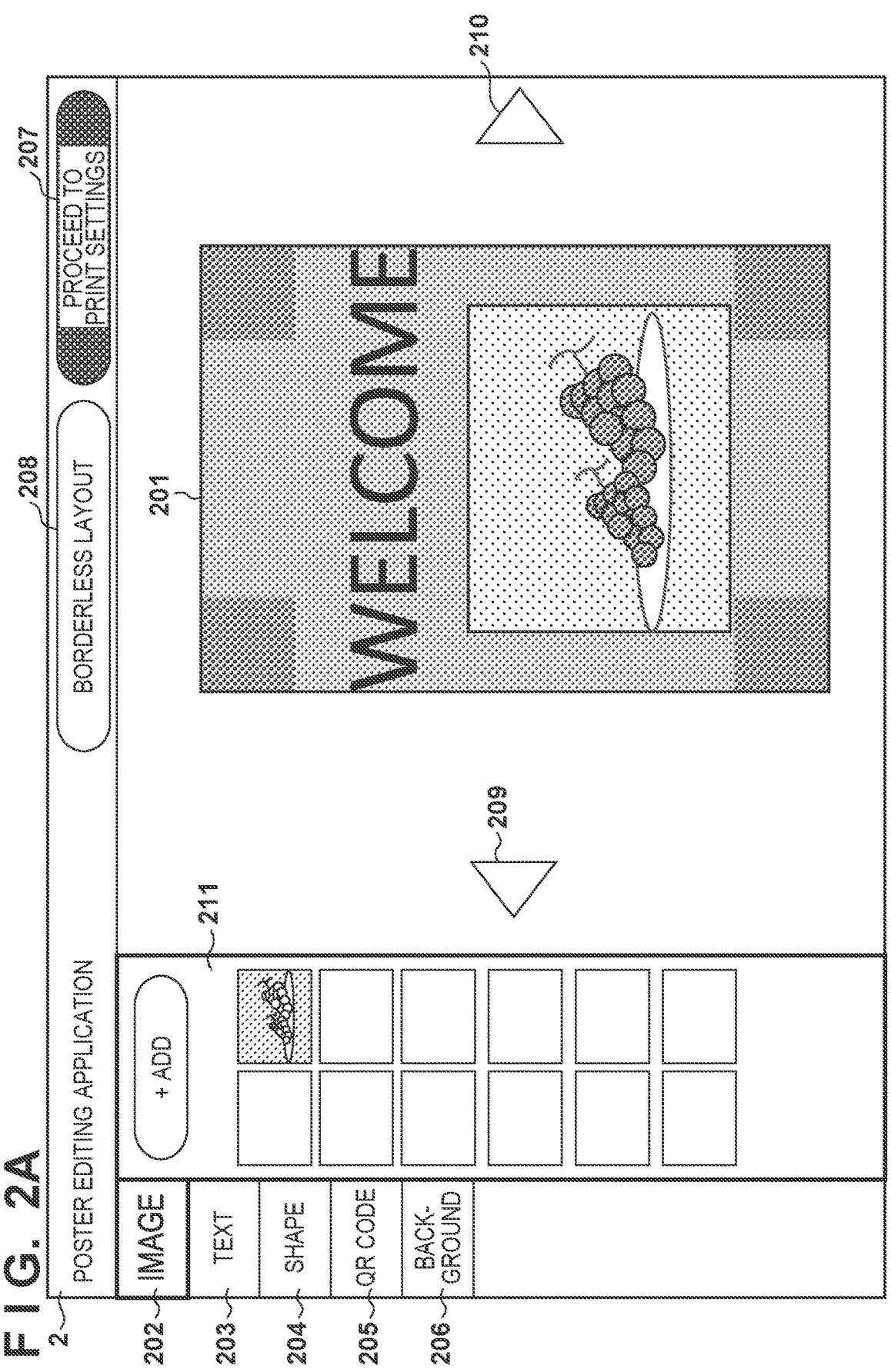

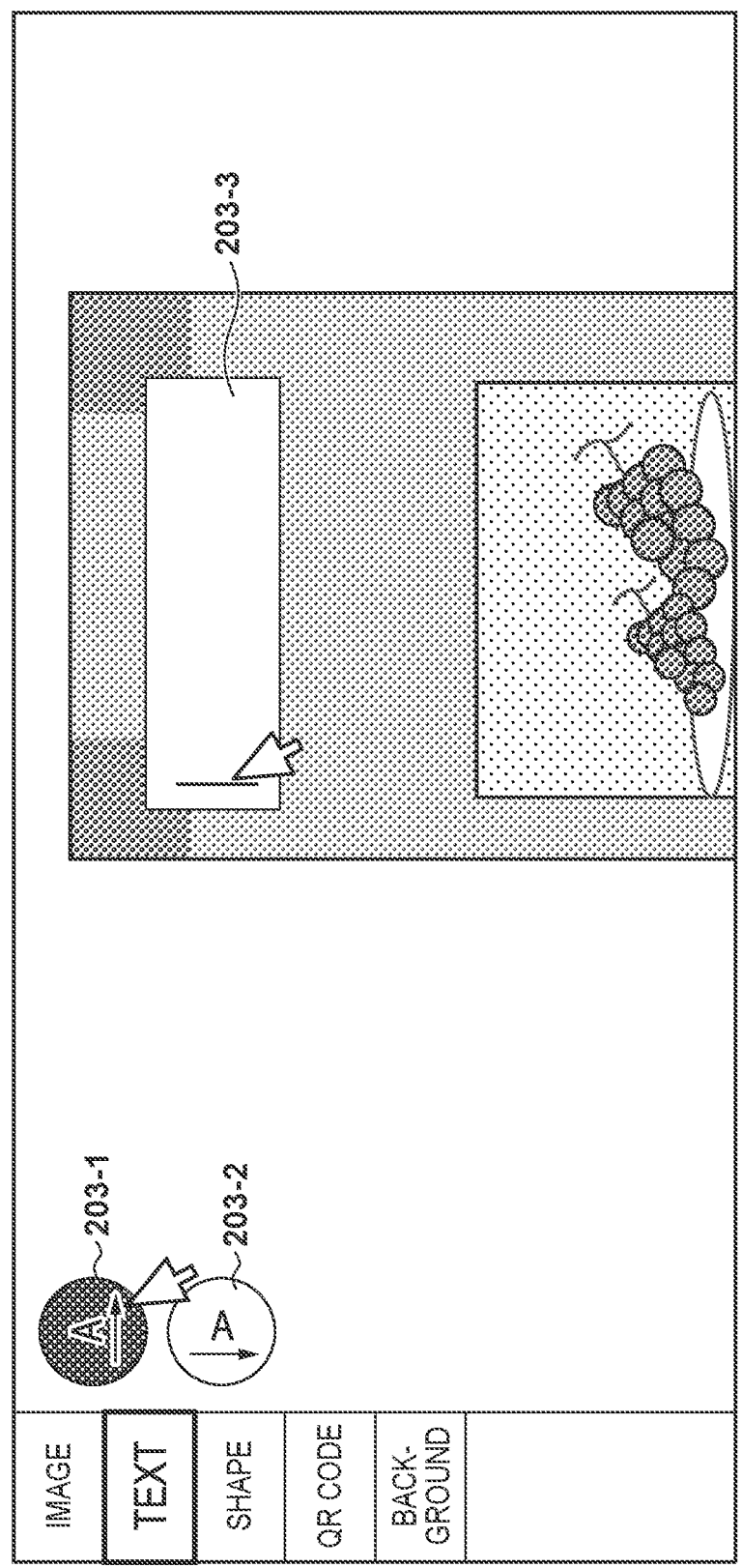

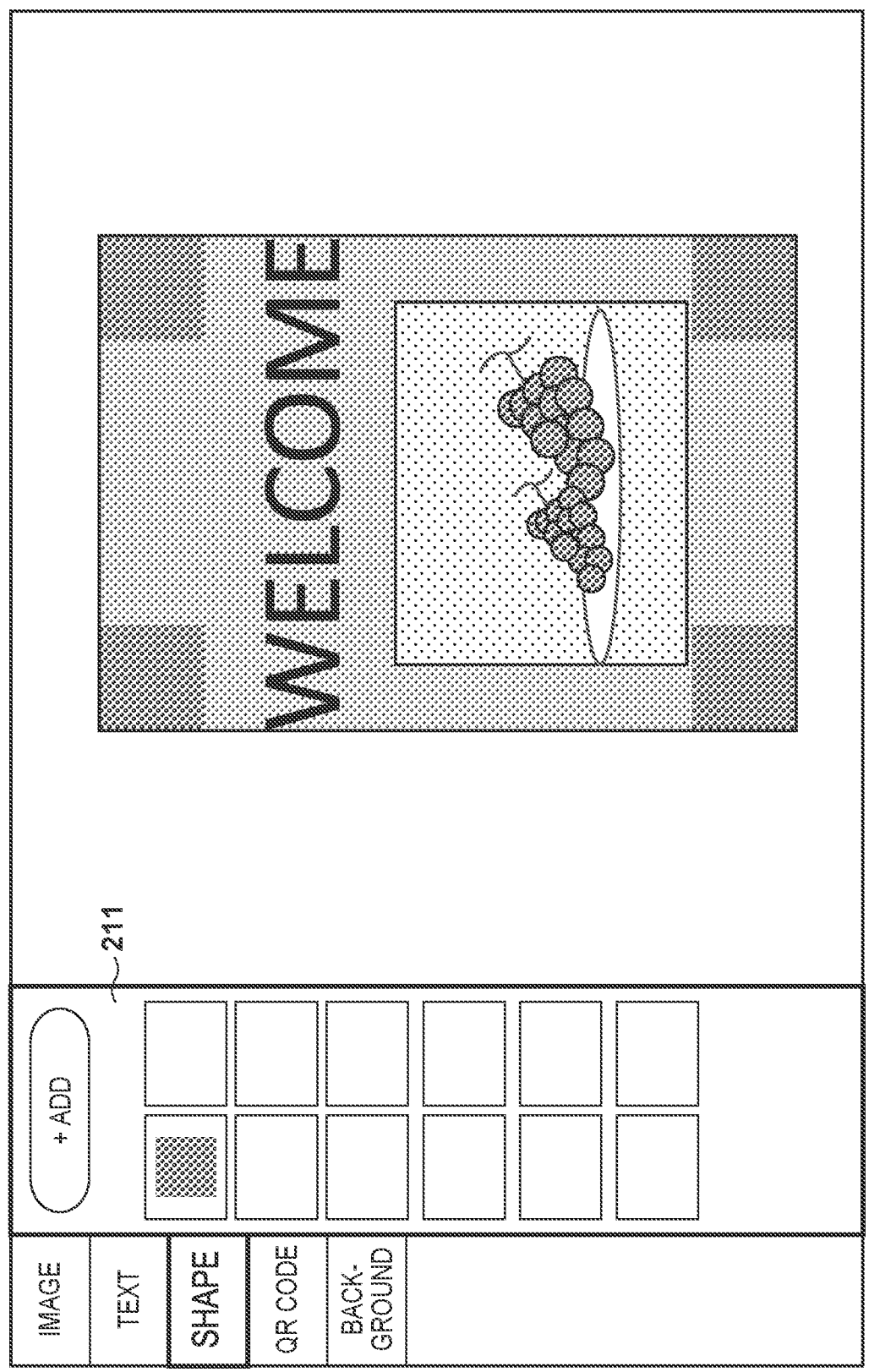

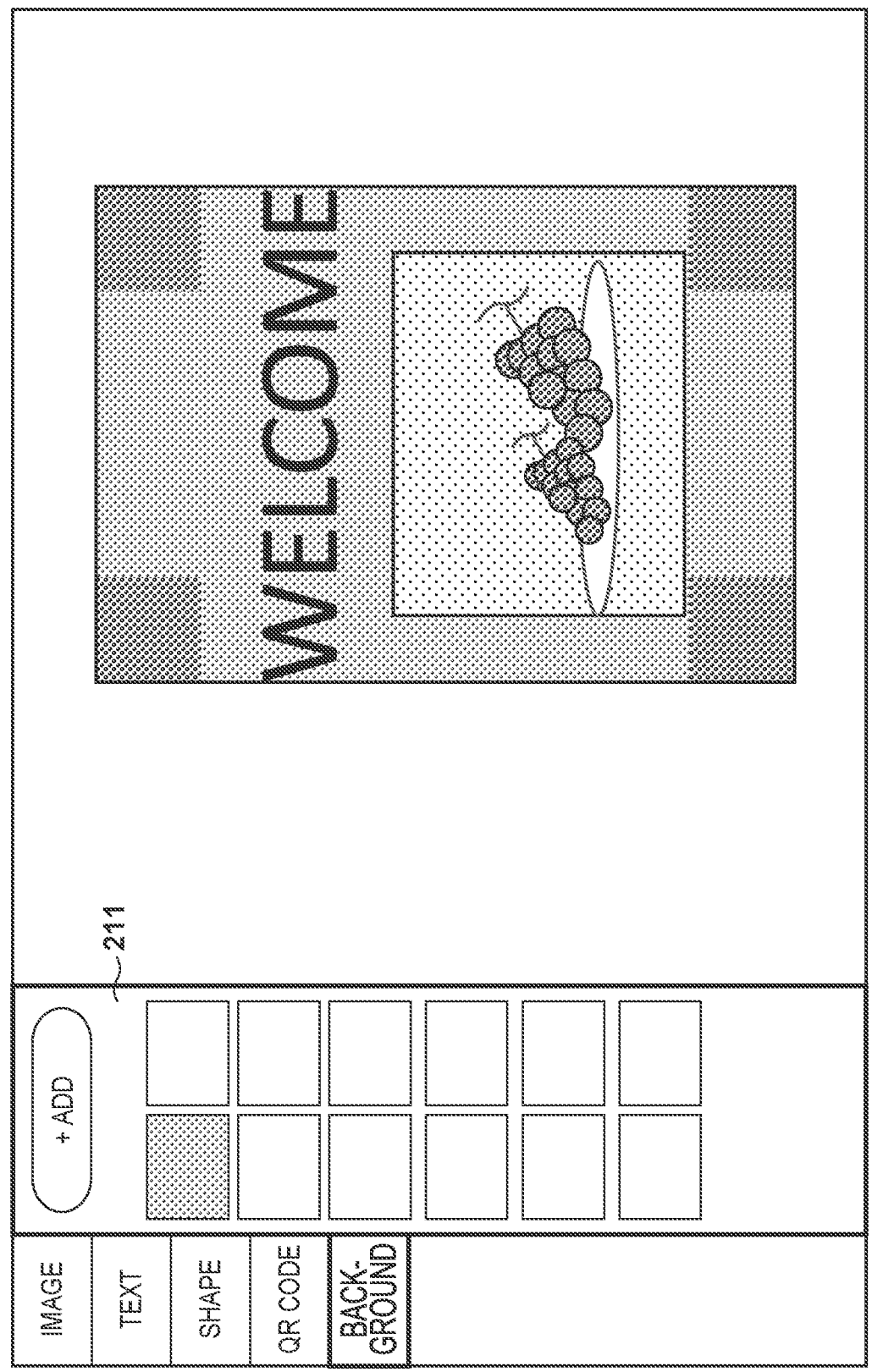

FIG. 3

POSTER EDITING APPLICATION

304 — RETURN

301 — WELCOME

302 — PRINTING SETTINGS
- PRINTER: Printer A
- FEEDING METHOD: CUT PAPER
- TYPE OF SHEET: A2
- ☐ BORDERLESS PRINTING
- ☐ NO TOP AND BOTTOM MARGINS
- ☐ ENLARGEMENT OR REDUCTION PRINTING
- PRINT QUALITY: CLEAR
- NUMBER OF COPIES: 1

303 — PRINT

FIG. 4

POSTER EDITING APPLICATION

RETURN

[Preview area showing "WELCOME" text with an image — 401]

PRINTING SETTINGS

PRINTER: Printer A
FEEDING METHOD: CUT PAPER
TYPE OF SHEET: A2

☑ BORDERLESS PRINTING
☐ NO TOP AND BOTTOM MARGINS
☐ ENLARGEMENT OR REDUCTION PRINTING

PRINT QUALITY: CLEAR
NUMBER OF COPIES: 1

PRINT

FIG. 8

| OBJECT | CAN EXTEND INTO EXTEND REGION? |
|---|---|
| IMAGE OBJECT | true |
| TEXT OBJECT | false |
| SHAPE OBJECT | true |
| QR CODE OBJECT | false |
| BACKGROUND OBJECT | true |

FIG. 11

STORAGE MEDIUM STORING PROGRAM, INFORMATION PROCESSING APPARATUS, AND CONTROL METHOD

BACKGROUND OF THE INVENTION

Field of the Invention

The present invention relates to a storage medium storing one or more programs, an information processing apparatus, and a control method.

Description of the Related Art

Borderless printing is a known technique used when printing posters, business cards, pamphlets, and the like for printing without margins on the printing medium. For example, so that no margins are formed on a sheet corresponding to a printing medium, the technique described in Japanese Patent Laid-Open No. 2003-216366 includes arranging and enlarging a print region based on print data to a size greater than the sheet and printing a print region which extends out of the sheet. Also, the technique described in Japanese Patent Laid-Open No. 2003-216366 includes executing fit processing when performing borderless printing to fit data other than the background within a borderless printing virtual printing enabled region so that the data other than the background is not cut off when printed.

SUMMARY OF THE INVENTION

The present invention provides techniques relating to borderless printing for suppressing printing results not intended by the user.

The present invention in one aspect provides a non-transitory computer-readable storage medium storing one or more programs configured to cause one or more computers to function as: a receiving unit configured to receive an instruction for a re-layout for borderless printing of one or more objects included in a page that can be printed by a printing apparatus; and a re-layout unit configured to execute re-layout processing of the one or more objects when the instruction is received by the receiving unit, the re-layout processing including at least processing to scale down a predetermined object that does not satisfy a predetermined condition relative to a background object so that, for an object other than the background object from among the one or more objects, an object that satisfies the predetermined condition is allowed to extend into, from among a printable region and an extend region in the page in a case of borderless printing, the extend region and an object that does not satisfy the predetermined condition is not allowed to extend into the extend region.

According to the present invention, in borderless printing, printing results not intended by the user can be suppressed.

Further features of the present invention will become apparent from the following description of exemplary embodiments (with reference to the attached drawings).

BRIEF DESCRIPTION OF THE DRAWINGS

FIG. 2A is a diagram illustrating an example of an editing screen provided by an application.

FIG. 2B is a diagram illustrating an example of an editing screen provided by the application.

FIG. 2C is a diagram illustrating an example of an editing screen provided by the application.

FIG. 2D is a diagram illustrating an example of an editing screen provided by the application.

FIG. 3 is a diagram illustrating an example of an editing screen provided by the application.

FIG. 4 is a diagram illustrating an example of an editing screen provided by the application.

FIG. 8 is a list stored by the application of object types and whether that type is permitted to extend out of the print region.

FIG. 11 is a diagram illustrating an example of an editing screen provided by the application.

DESCRIPTION OF THE EMBODIMENTS

Figure 1A:
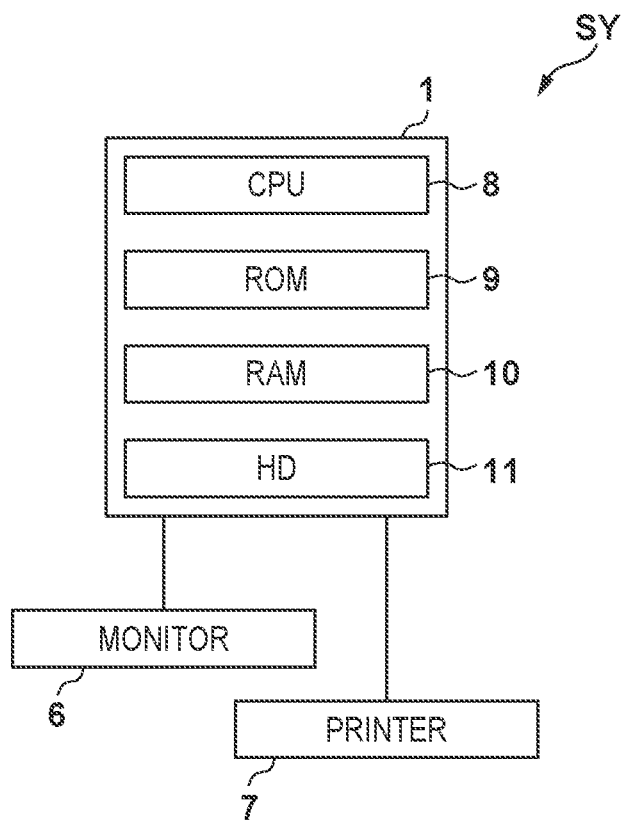
FIG. 1A is a diagram illustrating an example configuration of an information processing system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

With known techniques, depending on the layout of an object, a printing result not intended by the user may occur.

According to the present disclosure, it is possible to provide techniques relating to borderless printing for suppressing printing results not intended by a user.

First Embodiment

Figure 1B:
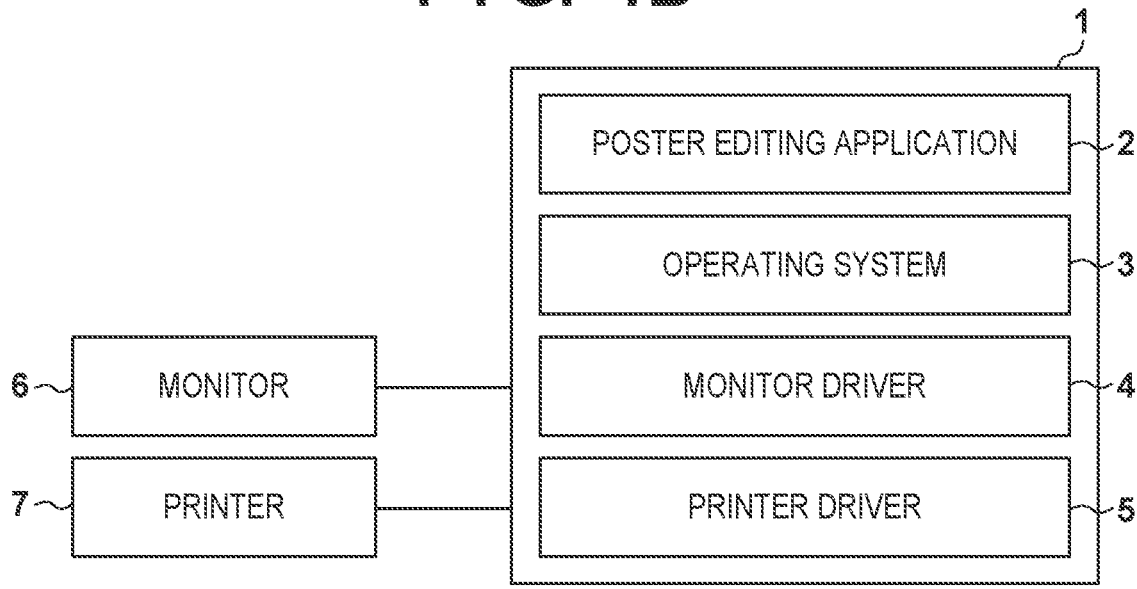
FIG. 1B is a block diagram illustrating the software configuration of an information processing apparatus.

Information Processing System (FIGS. 1A and 1B)

FIG. 1A is a diagram illustrating an example configuration of an information processing system SY according to an embodiment. The information processing system SY includes an information processing apparatus 1, a monitor 6, and a printer 7. The information processing apparatus 1, the monitor 6, and the printer 7 are connected via an interface unit (not illustrated) of the information processing apparatus 1. These components will now be described in further detail.

The printer 7 forms (prints) an image on a printing medium by applying a recording agent such as ink on a printing medium such as paper. The printer 7 may be a multi-function peripheral provided with a plurality of functions, such as a copying function, a FAX function, a printing function, and the like. Note that in the present embodiment, the printer 7 is an apparatus that prints using an inkjet recording method but is not limited thereto. For example, the printer 7 may be an apparatus that prints using an electrophotographic method or a dye-sublimation thermal method. Note that in the present embodiment, the printer 7 may also be a printing apparatus that can print using spot color ink. Spot color ink is ink that expresses a spot color and is an ink that expresses a color when printed that cannot be expressed in the SRGB color space, for example. In other words, the printer 14 is configured to perform spot color printing, which is printing using a spot color ink which is different to regular inks. Regular inks are inks for printing a process color (regular color), and the basic process colors include colors such as cyan (C), magenta (M), yellow (Y), and black (K). Note that a process color may be a color expressed by one color from among CMYK or a combination of two or more colors from among CMYK. Also, in the present embodiment, a fluorescent pink ink or a fluorescent orange ink is used as a spot color ink. That is, a spot color is a color that is not a process color and cannot be expressed by only one color from among CMYK or a combination of two or more colors from among CMYK. However, no such limitation is intended, and the number and color of the spot color ink is discretionary, and a non-fluorescent color ink may be used. For example, violet ink, green ink, orange ink, gold ink, silver ink, or the like may be used as the spot color ink. Also, other metallic color inks may be used. Furthermore, a blended ink of a spot color ink and another ink (for example, a regular ink) may be used as a spot color ink. Also, in the present embodiment, objects from the image data printed with a spot color are associated with information (referred to as spot color information) indicating that they are printed with a spot color. Also, a pixel attached with spot color information is printed according to the spot color corresponding to the RGB value of that pixel. Note that the RGB value of a pixel corresponding to a spot color can also be used as the RGB value of a pixel corresponding to a color (that is, a regular color) expressed only by a regular ink. In other words, an RGB value that is the same as the RGB value of a pixel corresponding to a spot color may be set to a pixel corresponding to a color that is to be expressed by regular ink alone. In this case, whether or not special ink is to be used for printing the pixel of the RGB value is controlled according to whether or not special color information is added.

The information processing apparatus 1 may be a terminal apparatus such as a personal computer, for example. The information processing apparatus 1 includes a CPU 8, a ROM 9, a RAM 10, and a hard disk (HD) 11. These components are electrically connected via a non-illustrated bus inside the information processing apparatus 1. Note that the information processing apparatus 1, the monitor 6, and the printer 7 may be directly connected via a cable or may be connected via a wired or wireless LAN or the like. Also, the information processing apparatus 1 and the monitor 6 may be integrally formed such as with a laptop computer or a tablet terminal.

The CPU 8 implements various functions of the information processing apparatus 1 by reading out a program stored in the ROM 9 to the RAM 10 and executing the program. In other words, by the CPU 8, which is an example of a piece of hardware, specifically implementing information processing by the software stored in the ROM 9, the various functions of the information processing apparatus 1 are implemented. This will be described below. The RAM 10 is used as a temporarily storage area when the CPU 8 is executing various types of processing. For example, an operating system 3, a poster editing application program 2 (hereinafter, referred to as application 2) described below, and the like are stored in the ROM 9 or the hard disk (HD) 11. Note that each component of the information processing apparatus 1 is not limited to being a single component.

FIG. 1B is a block diagram illustrating the software configuration of the information processing apparatus 1. The information processing apparatus 1 includes, as the software configuration, the application 2, the operating system 3, a printer driver 5, and a monitor driver 4.

The application 2 is an application for editing posters. The application 2 executes predetermined processing and issues various rendering processing command groups for generating an image for displaying the results of executing the processing. Examples of the various types of rendering processing command groups include image rendering commands, text rendering commands, graphics rendering commands, and the like. Note that the application 2 may be an application with a function for causing the printer 7 to execute printing using spot color ink.

The monitor driver 4 processes the input rendering processing command group and displays it on the monitor 6. The rendering command group issued by the application 2 is input into the monitor driver 4 via the operating system 3.

The printer driver 5 is distributed by the printer vendor and can be used after being installed by the user. Also, the printer driver 5 may be distributed together with the OS. The printer driver 5 processes the input rendering processing command group, generates print data, and causes the printer 7 to print. For example, when the rendering command group issued by the application 2 relates to printing, the rendering command group is also input into the printer driver 5.

Also, specifically, the application 2 generates output image data using text data to be classified as text such as characters, graphics data to be classified as graphics such as shapes, and image data to be classified as images and the like. The output image data is displayed on the monitor 6. Also, when the application 2 prints the image based on the output image data, the application 2 sends a print output request to the operating system 3. At this time, a rendering command group in which the text data portion is configured by a text rendering command, the graphics data portion is configured by a graphics rendering command, and the image data portion is configured by an image rendering command is issued to the operating system 3.

Image Editing Application (FIGS. 2A to 3)

FIG. 2A is a diagram illustrating an example of an editing screen provided by the application 2. The illustrated editing screen has the function of placing an object on a poster and editing. The application 2 may be a native application installed and used on the information processing apparatus 1 or may be a Web application executable via a Web browser.

A page 201 represents one page of a poster being edited. The user can freely select an object from tabs 202 to 206 and placed the object on the page 201 to generate a poster. FIG. 2A illustrates a state in which the tab 202 is selected. Also, the user can freely change the size of the page 201 within the application 2 (not illustrated).

The tab 202 is a button for displaying a group of images that can be added. When the tab 202 is selected, a group of images that can be added to the poster is displayed in a region 211. The image group at this time may be an image group prepared within the application, an image group stored within the information processing apparatus 1 by the user, or an image group in the cloud. The user can select one or more images from the image group and place them on the page 201 as image objects.

The tab 203 is a button for adding a text object. Here, FIG. 2B is an example of an editing screen provided by the application 2 and illustrates a state in which the tab 203 is selected. When the tab 203 is selected, a button 203-1 and a button 203-2 are displayed. The button 203-1 is a button for adding horizontally orientated text. The button 203-2 is a button for adding vertically orientated text. After the user selects the button 203-1 or the button 203-2 and selects a discretionary location on the page 201, a text object 203-3 is added on the page 201. The user can freely input text in the text object 203-3. In FIG. 2B, with the button 203-1 being selected, it can be seen that horizontally orientated text can be added in the text object 203-3.

Now we will return to the description of FIG. 2A. The tab 204 is a button for displaying a group of shapes that can be added. Here, FIG. 2C is an example of an editing screen provided by the application 2 and illustrates a state in which the tab 204 is selected. When the tab 204 is selected, a group of shapes that can be added to the poster is displayed in the region 211. The shape group displayed here may be a shape group prepared within the application 2, a shape group stored within the information processing apparatus 1 by the user, or a shape group in the cloud. The user can select one or more shapes from the shape group and place them on the page 201 as shape objects. Note that the shape data constituting the shape object at this time may be vector data or may be raster data.

Now we will return to the description of FIG. 2A. The tab 205 is a button for adding a QR code (registered trademark). When the tab 205 is selected, an input area for a character string to be converted to a code and a generate button are displayed in the region 211 (not illustrated). When the user enters discretionary characters in the character string input area and selects the generate button, a QR code (registered trademark) is added to the page 201.

The tab 206 is a button for displaying a group of backgrounds that can be added. Here, FIG. 2D is an example of an editing screen provided by the application 2 and illustrates a state in which the tab 206 is selected. When the tab 206 is selected, a group of backgrounds that can be added to the poster is displayed in the region 211. The background group at this time may be a background group prepared within the application 2, a background group stored within the information processing apparatus 1 by the user, or a background group in the cloud. The user can select one of the backgrounds and place it on the page 201 as a background object. Note that the background data at this time may be vector data or may be raster data.

Now we will return to the description of FIG. 2A. A button 207 is a button for proceeding to the print settings for the poster. Here, FIG. 3 is an example of a screen provided by the application 2 and illustrates a print settings screen. When the button 207 is selected, this screen is displayed. A print settings region 302 is a region for setting various types of settings relating to printing including the printer, sheet type, sheet size, borderless printing, and the like. A print preview 301 is a preview screen in the case of printing with the current settings based on the contents set in the print settings region 302. A button 303 is a button for executing printing. When the button 303 is pressed, various types of rendering processing command groups are issued on the basis of the output image data of the state displayed in the print preview 301. When the various types of rendering processing command groups are input into the printer driver 5 via the operating system 3, the printer driver 5 processes the input rendering processing command groups and generates print data. The printer 7 receives the print data and executes printing based on the received print data. A button 304 is a button for returning to the editing screen of FIG. 2A or the like from the print settings screen.

Now we will return to the description of FIG. 2A. A button 208 is a button for executing a borderless layout. Though described below in detail, when the button 208 is selected, the application 2 executes an automatic layout for borderless printing according to the intention of the user. A button 209 is a button for displaying the previous page. When the data generated by the user is only one page or when the first page is displayed, the button 209 may not be displayed or may be made inactive. A button 210 is a button for displaying the next page. When the data generated by the user is only one page or when the last page is displayed, the button 210 may not be displayed or may be made inactive.

Borderless Printing (FIG. 4)

FIG. 4 illustrates a print settings screen of when the borderless printing setting is enabled. The borderless printing setting indicates a setting for generating print data of a print image larger than the sheet size and executing printing extends beyond the sheet in order to remove the top, bottom, left, and right margins when printing.

Here, a print preview 401 illustrates a preview when borderless printing is selected in the print settings region 302 without performing an automatic layout for borderless printing described below. In the print preview 401, the print image of the print preview 301 with the borderless printing setting disabled is enlarged and repositioned to match the size of the sheet. In the print preview 401, the portion that extends beyond the sheet due to the enlargement of the print image is outside of the print-to-sheet area and not displayed. In the example in FIG. 4, since the centrally positioned text includes characters positioned near the edge of the page, some of the characters have been cut off. When this is contrary to the printing result intended by the user, the user has to go to the trouble to change the size and position of the text object.

Alternatively, so that the user can perform borderless printing without backtracking, a layout for borderless printing can be automatically executed on the basis of the object position and type. In this case, so that objects other than a background object can assuredly fit within the sheet in a print image, the objects can be uniformly scaled down. This can suppress occurrences of the characters of text being cut off and the like. However, with this method, for example, a shape object placed at the edge portion of the print image is also scaled down. Thus, when actually printed on a sheet, background may be seen between the shape object and the sheet edge, resulting in a printing result not intended by the user. In this case also, the user has to go to the trouble to change the size and position of the shape object.

Regarding this, in the present embodiment, the application 2 automatically executes a layout for borderless printing on the basis of the object position and type so that borderless printing can be performed without the user backtracking. This will be described in detail below.

Processing Example (FIGS. 5 to 11 and 14)

Figure 14:
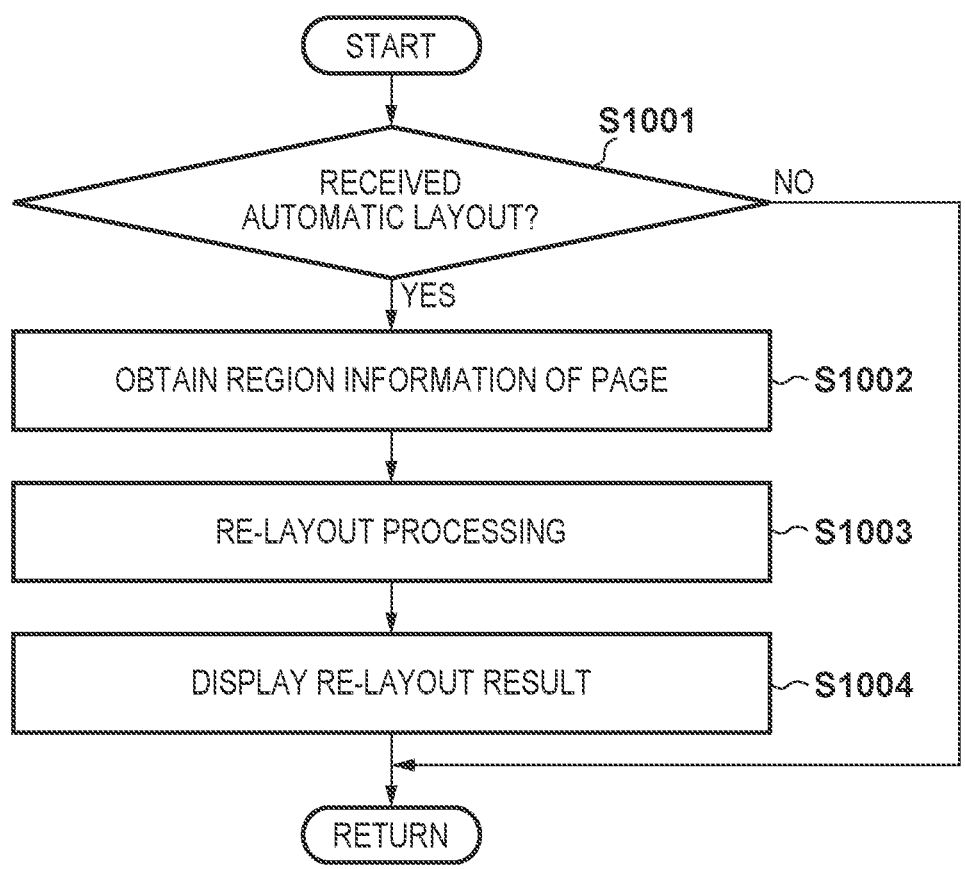
FIG. 14 is a flowchart illustrating a processing example for the information processing apparatus.

FIG. 14 is a flowchart illustrating an overview of the automatic layout for borderless printing, which is a processing example for the information processing apparatus 1. For example, the present flowchart is repeatedly executed at a predetermined cycle while the application 2 is running.

In step S1001, when an instruction for an automatic layout (re-layout) for borderless printing is received, the application 2 proceeds the processing to step S1002. Otherwise, the flowchart ends. Specifically, when the button 208 in FIG. 2A is selected, the application 2 determines that an instruction for an automatic layout for borderless printing has been received.

In step S1002, the application 2 obtains region information of the target page. In other words, the application 2 obtains the printable region and the extend region in the target page for borderless printing. A specific example of the obtaining method will be described below (FIG. 5), but the printable region and the extend region will now be described.

Figure 6:
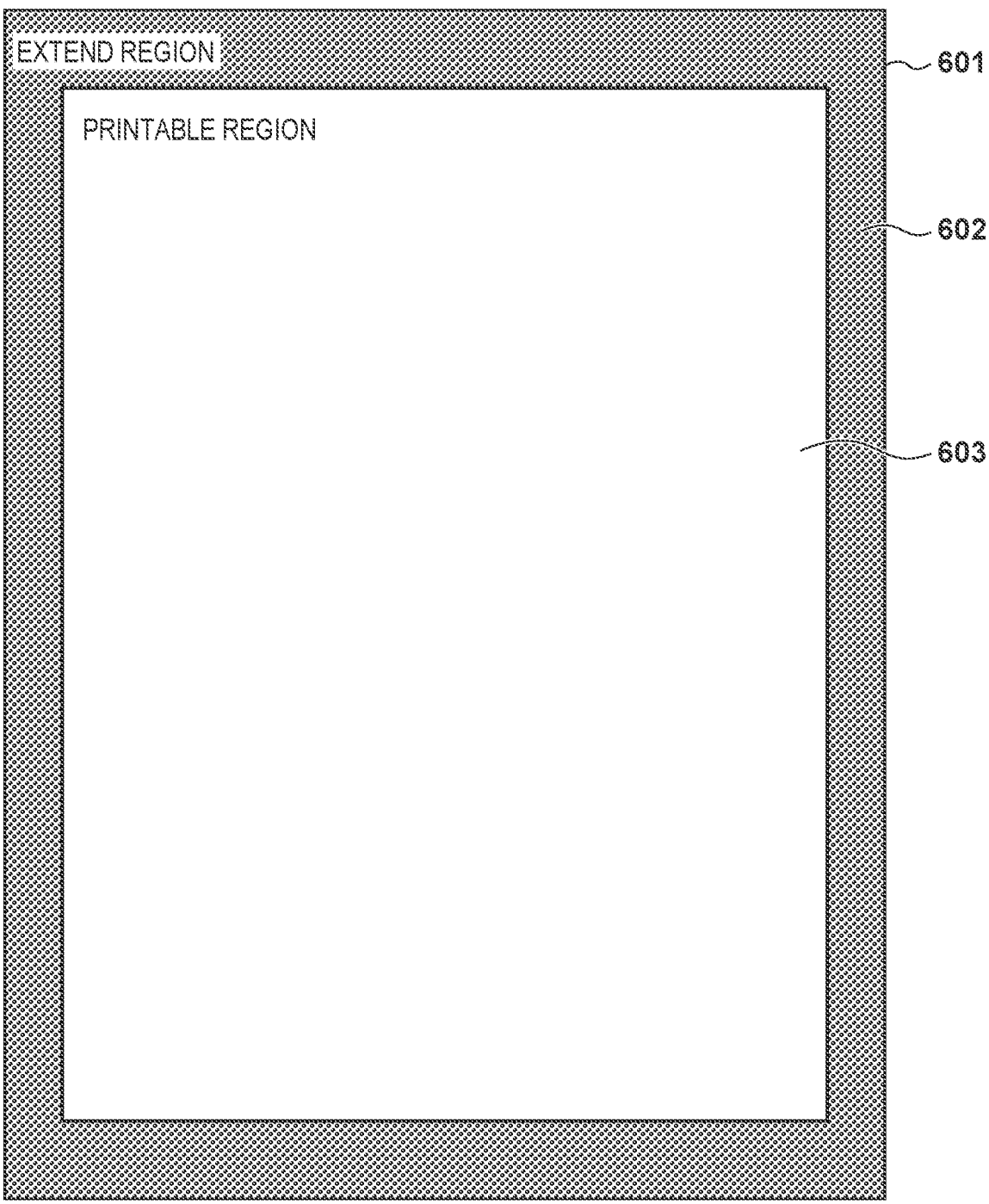
FIG. 6 is a diagram illustrating an example of region information of a page to be printed with borderless printing.

FIG. 6 is a diagram illustrating an example of the region information of a page to be printed with borderless printing. A page region 601 is a region including an extend region 602 and a printable region 603 that corresponds to the entire page of the target page for borderless printing. Accordingly, the size of the page region 601 corresponds to the size of the print region (region where ink is discharged in the case of an inkjet printer) based on the print data.

The printable region 603 is the region in the page region 601 where printing can be assuredly performed on the page when borderless printing is executed. The extend region 602 is located at the periphery of the printable region 603. The extend region 602 is the region that may extend out of the sheet when borderless printing is executed. In other words, in practice, there is a possibility that at least a portion of the extend region 602 will not be printed on the sheet.

Compared to the size of the sheet to be printed, the size of the printable region 603 is set according to the sheet size, and the periphery of the extend region 602 is set to surround the periphery of the sheet to be printed. In this manner, an image within the extend region 602 can be assuredly printed on the sheet, and a margin being formed at the edge portions of the sheet can be suppressed. Note that the printable region 603 may be the same size as the sheet to be printed or may be a slightly smaller size than the sheet to be printed.

Now we will return to the description of FIG. 14. In step S1003, the application 2 executes re-layout processing. Re-layout processing is processing to rearrange various types of objects placed on the page by the user via the application 2 for borderless printing. Here, the application 2 executes re-layout processing by allowing objects that satisfy a predetermined condition to extend into the extend region 602 and by not allowing objects that do not satisfy the predetermined condition to extend into the extend region 602. Also, for objects other than a background object, re-layout is executed depending on whether or not the predetermined condition is satisfied.

The predetermined condition is set as appropriate and will be described below in detail. To give an example, the predetermined condition may be that an object is not likely to produce printing that is contrary to the intention of the user even when the edge is cut off.

In step S1004, the application 2 displays the re-layout result. The details will be described below (see FIG. 5 and the like).

According to the processing described above, re-layout is performed so that objects that satisfy the predetermined condition are allowed to extend into the extend region 602 and objects that do not satisfy the predetermined condition are not allowed to extend into the extend region 602 and are fit in the printable region 603. In this manner, printing results not intended by the user can be suppressed. Also, for example, the predetermined condition may be set so that shape objects are allowed to extend into the extend region 602 and text objects are not allowed to extend into the extend region 602. In this case, with borderless printing, the characters of a text object being cut off or the like can be suppressed, and shape objects can be assuredly printed up to the edge of the sheet. In this manner, printing results not intended by the user can be suppressed.

Figure 5:
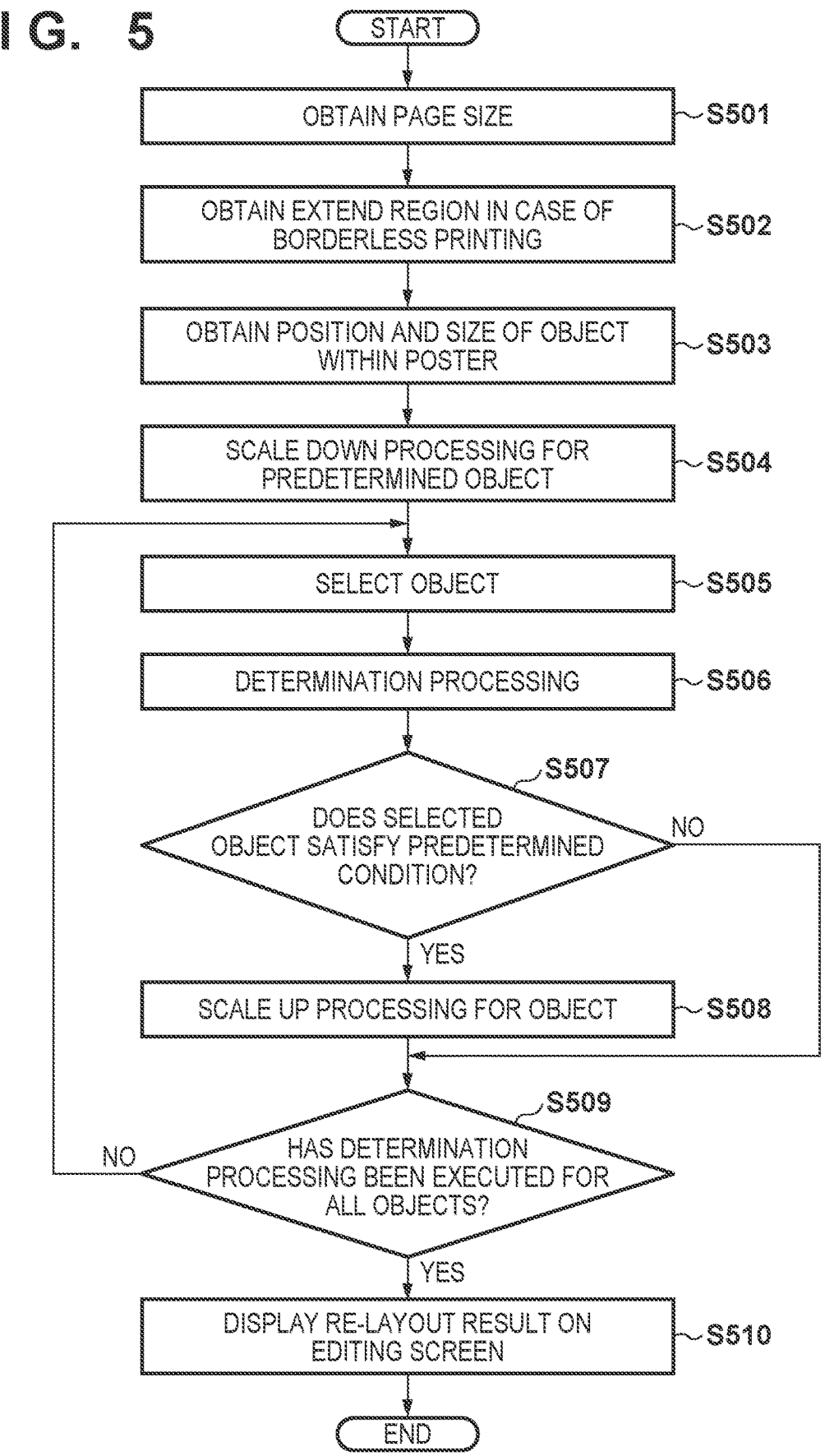
FIG. 5 is a flowchart illustrating a processing example for the information processing apparatus.

FIG. 5 is a flowchart illustrating a processing example for the information processing apparatus 1 which is a more detailed processing example of an automatic layout.

In step S501, the application 2 obtains the page size. For example, the application 2 obtains the horizontal page width and vertical page width of the page 201 illustrated in FIG. 2A. This obtained size corresponds to the size of the page region 601 in FIG. 6.

In step S502, the application 2 obtains the extend region in the case of borderless printing. For example, the application 2 obtains the extend width setting value in the case of borderless printing from the printer 7. Then, the application 2 obtains the extend region (the extend region 602 in FIG. 6) from the page size obtained in step S501 and the extend width setting value. Specifically, the region between the periphery of the page region 601 of the page 201 and a position located inward the amount of the extend width is specified as the extend region 602. Note that the portion of the page region 601 inward from the extend region 602 corresponds to the printable region 603, and thus it can be said that the application 2 also obtains the printable region 603. Note that the application 2 may be able to change the extend width of the region 602.

In step S503, the application 2 obtains the position and the size of the object within the page 201.

In step S504, the application 2 executes scale down processing for a predetermined object to fit the predetermined object within the printable region 603. For example, the predetermined object may be an object that is not a background object that is not extending outside the page region 601. At this time, the application 2 can place the object to fit in the printable region 603 by calculating the position and size of each object on the basis of a scale down ratio obtained from the size ratio of the page region 601 and the printable region 603. Note that in the present embodiment, there is a high possibility that an object extending outside the page region 601 before re-layout was intended to be printed extending out when borderless printing is performed. Thus, even if it is an object other than a background object, scale down processing is not executed. However, objects other than background objects including objects extending outside the page region 601 may be scaled down.

Figure 7:
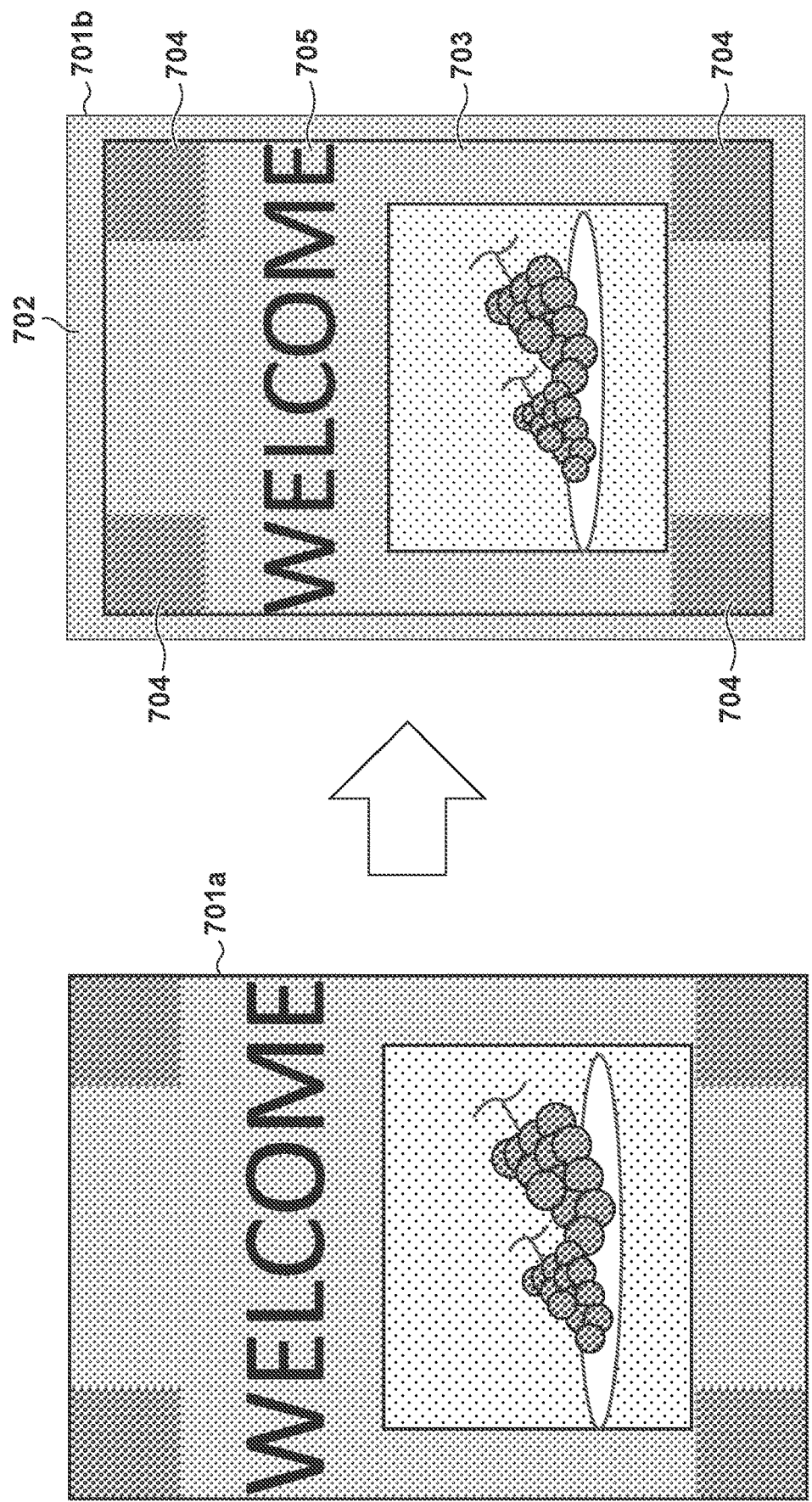
FIG. 7 is a diagram illustrating a layout of a poster when step S504 in FIG. 5 is executed.

An example of when step S504 is executed is illustrated in FIG. 7. Here, the application 2 scales down and places a shape object 704 and a text object 705 to fit in the printable region. Specifically, a page 701a is a poster before step S504 is executed, and a page 701b is a poster after step S504 is executed. By scaling down and placing the objects to be scaled down in the printable region as in the page 701b, the objects (the shape object 704 and the text object 705) do not overlap with an extend region 702 in a case of borderless printing and thus can be assuredly printed.

Note that in this example, the objects are fit in a printable region 703 via scaling down of the objects. However, the objects may be fit in the printable region 703 by moving the objects. Alternatively, the objects may be fit in the printable region 703 by both scaling down and moving the objects. Furthermore, scaling down and moving of the objects may be selectively use depending on the position and type of the object.

Here, by fitting the predetermined object within the printable region 703 via the processing of step S504, the predetermined object can be assuredly printed on a sheet. However, when the page 701b is actually printed on a sheet, there may be some variation in how much the extend region 702 is printed on the sheet. Thus, for example, when the extend region 702 is printed on a sheet wide enough to be visible, there is a possibility that an object such as the shape object 704 that borders the printable region will be placed with a gap between it and the page edge on the actual sheet. As a result, the printing result intended by the user may not be obtained. Also, when the text object 705 is placed in the extend region, the characters may be cut off. Thus, the text object 705 needs to be fit assuredly within the printable region. According to the present processing example, the intention of the user is reflected and cutoff of the characters of text is suppressed by executing the following processing.

In step S505, the application 2 selects one of the objects in the page 201. In step S506, the application 2 executes processing to determine whether or not the selected object satisfies a predetermined condition. The predetermined condition can be set as appropriate. In the present embodiment, whether or not the predetermined condition is satisfied is determined on the basis of information, which includes object type and extend into the extend region permissibility associated together, stored in the information processing apparatus 1.

FIG. 8 is a list stored by the application 2 of object types and whether that type is permitted to extend into the extend region. For example, when the type of the object selected in step S505 has true for extend permissibility, the application 2 determines that the predetermined condition is satisfied. However, when the type of the object selected in step S505 has false for extend permissibility, the application 2 determines that the predetermined condition is not satisfied. According to FIG. 8, when the selected object is a text object or a QR code object, the application 2 determines that the predetermined condition is not satisfied. Also, when the selected object is an image object, a shape object, or a background object, the application 2 determines that the predetermined condition is satisfied.

Note that in the present embodiment, whether or not the predetermined condition is satisfied is determined according to the object type. However, the predetermined condition can be changed as appropriate. For example, when the selected object is an image object but includes a face image of a person, the application 2 may determine that the predetermined condition is not satisfied. Also, for example, when the selected object is a shape object but is an object (such as a circle, a star, or the like) that is easy to recognize when a piece is missing, the application 2 may determine that the predetermined condition is not satisfied. Also, for example, when the selected object is a shape object but is a logo mark or the like, the application 2 may determine that the predetermined condition is not satisfied. In other words, the application 2 may determine whether or not the predetermined condition is satisfied on the basis of how much it is affected when a piece of the object is missing.

In step S507, when the application 2 determines that the selected object satisfies the predetermined condition, that is, the selected object can extend into the extend region 602, the processing proceeds to step S508. Otherwise, the processing proceeds to step S509.

In step S508, the application 2 executes scale up processing for the object. In other words, the application 2 scales up the object to the extend region 602. Via steps S506 to S508, objects that satisfy the predetermined condition is scaled up to the extend region 602. However, for objects that do not satisfy the predetermined condition, the scale up processing of step S508 is not executed.

Note that for objects, from among objects that satisfy the predetermined condition, with a predetermined positional relationship with the periphery of the printable region 603, the application 2 may scale them up to the extend region 602. For example, for an object that satisfies the predetermined condition and has a predetermined positional relationship that borders to the periphery of the printable region 603, the application 2 may scale it up to the extend region 602. Also, for an object that satisfies the predetermined condition and has a shortest distance to the periphery of the printable region 603 equal to or less than a threshold, the application 2 may scale it up to the extend region 602.

Also, how much the scale up processing scales up can be changed as appropriate. For example, the application 2 may scale up the object to be scaled up the amount equal to the extend width of the extend region 602. In other words, the application 2 may scale up the object to be scaled up so that the object, after being scaled up, borders the periphery (that is, the periphery of the page region 601) of the extend region 602. In this case, a gap being formed between the object and the page edge on the sheet after printing can be assuredly prevented. Also, for example, the application 2 may scale up the object to be scaled up a predetermined percentage. In this case, a gap being formed between the object and the page edge on the sheet after printing can be almost certainly prevented, the overall balance being upset by the object being scaled up too much can be suppressed.

Also, how the scale up processing scales up can be changed as appropriate. For example, the object to be scaled up may be scaled up without changing the vertical and horizontal aspect ratio, or the object to be scaled up may be scaled up in a predetermined direction (for example, either vertically or horizontally). Furthermore, an object that borders the four corners of the printable region 603 may be scaled up without changing the aspect ratio, and an object that borders only the vertical or horizontal side of the printable region 603 may be scaled up in only the vertical or horizontal direction.

In step S509, the application 2 checks whether or not the determination processing of step S506 has been executed for all of the objects. If this has been executed, the processing proceeds to step S510, otherwise, the processing returns to step S505.

Figure 9:
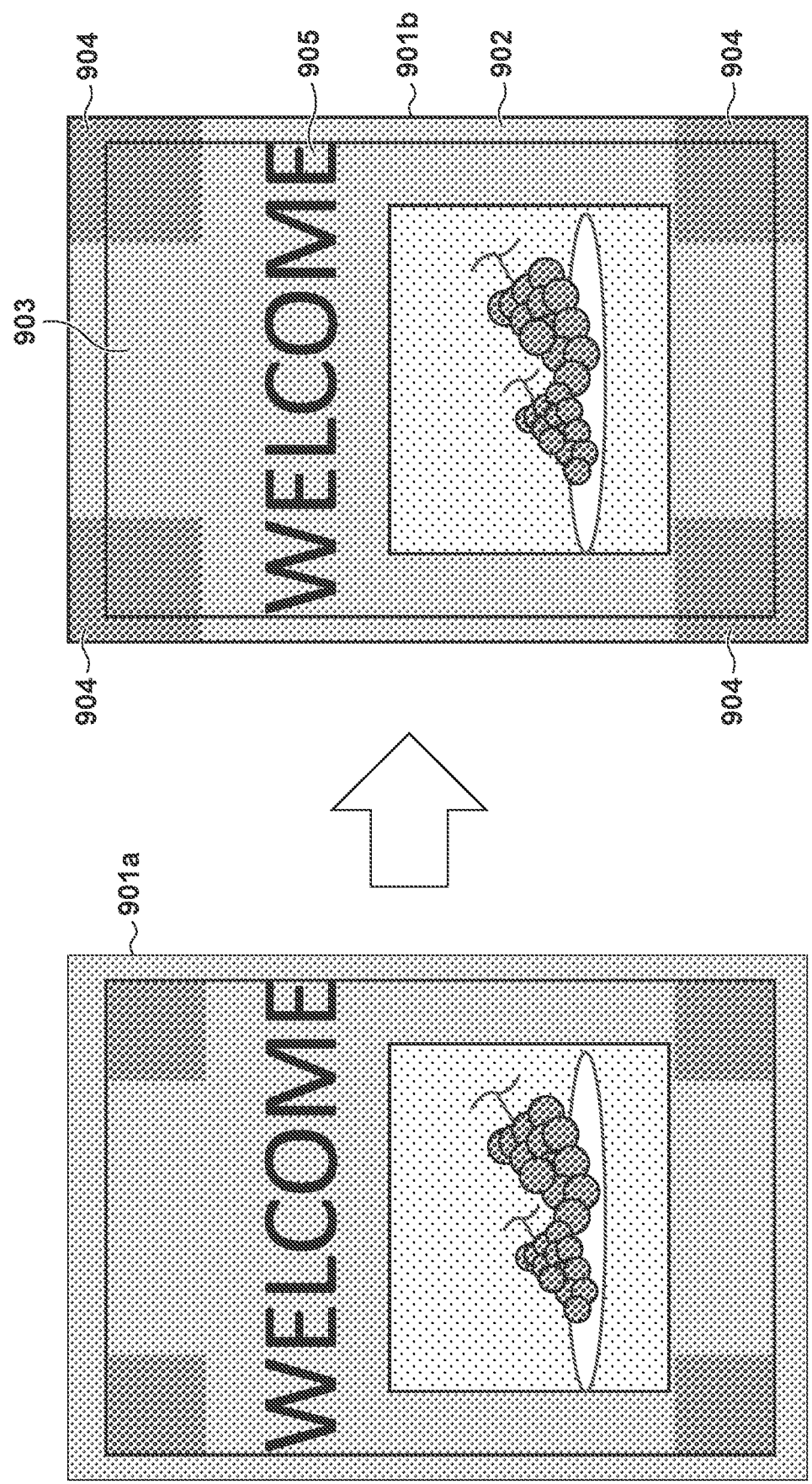
FIG. 9 is a diagram illustrating an example of a re-layout of an object when steps S505 to S509 in FIG. 5 are executed.

FIG. 9 is a diagram illustrating an example of a re-layout of an object when steps S505 to S509 are executed. A page 901a is a page showing a poster before the steps S505 to S509 have been executed, a page 901b is a page showing a poster after the steps S505 to S509 have been executed on all of the target objects. The page 901 includes an extend region 902 and a printable region 903. A shape object 904 is determined to be an object that satisfies (can extend out) the predetermined condition in step S505 and thus is scaled up in step S506. On the other hand, a text object 905 is determined to be an object that does not satisfy (cannot extend out) the predetermined condition in step S505 and thus is not scaled up and fits in the printable region 903.

Figure 10:
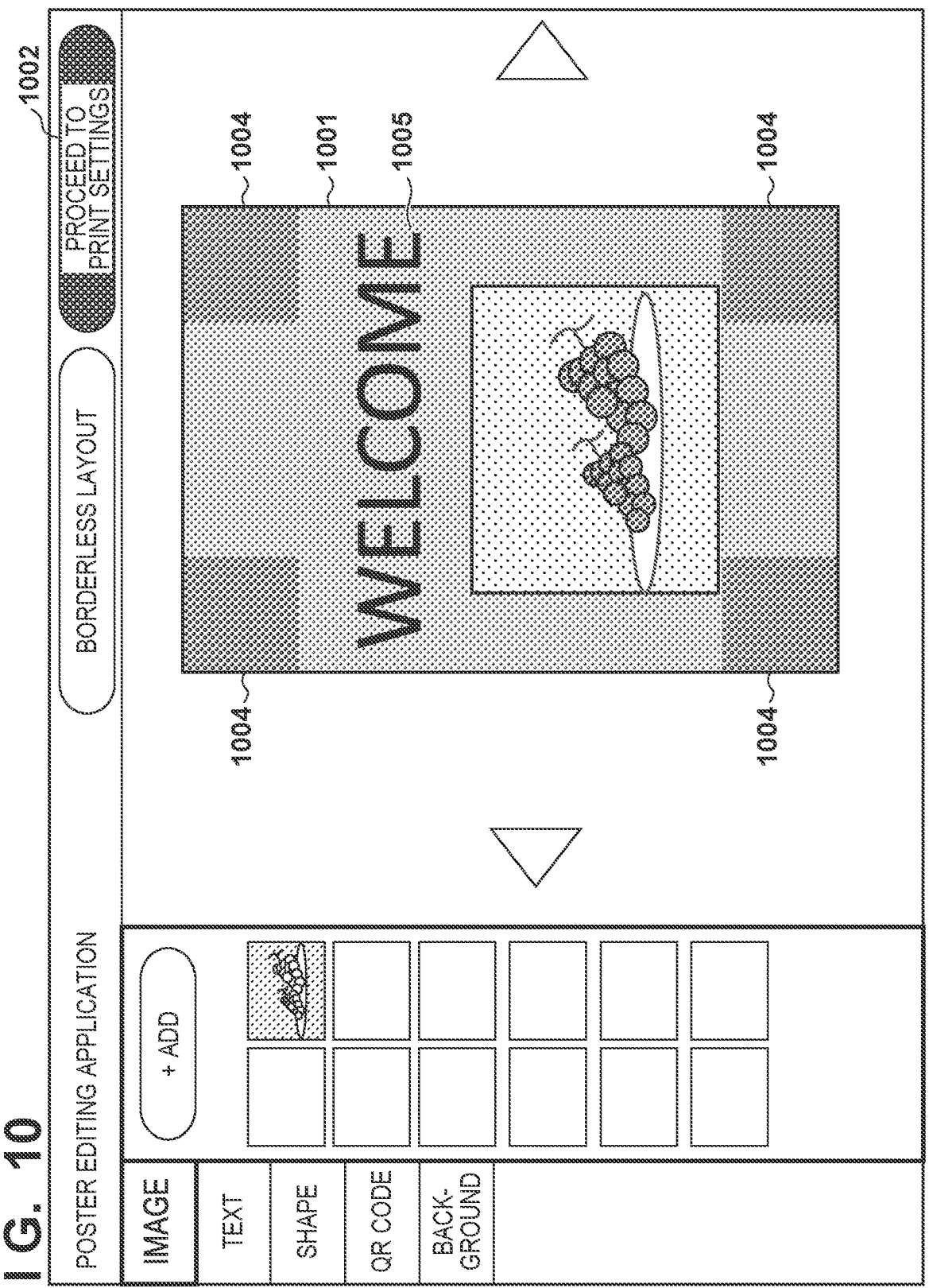
FIG. 10 is a diagram illustrating an example of an editing screen provided by the application.

In step S510, the application 2 displays the re-layout result on the editing screen. FIG. 10 is a diagram illustrating a display example for step S510. Here, all of the page region 601 including the extend region 602 is displayed as a page 1001. As illustrated on the page 1001, a shape object 1004 borders the edge of the image data scaled up to the extend region, but a text object 1005, by being fit in the printable region, is placed a distance from the edge of the image data.

Figure 11:
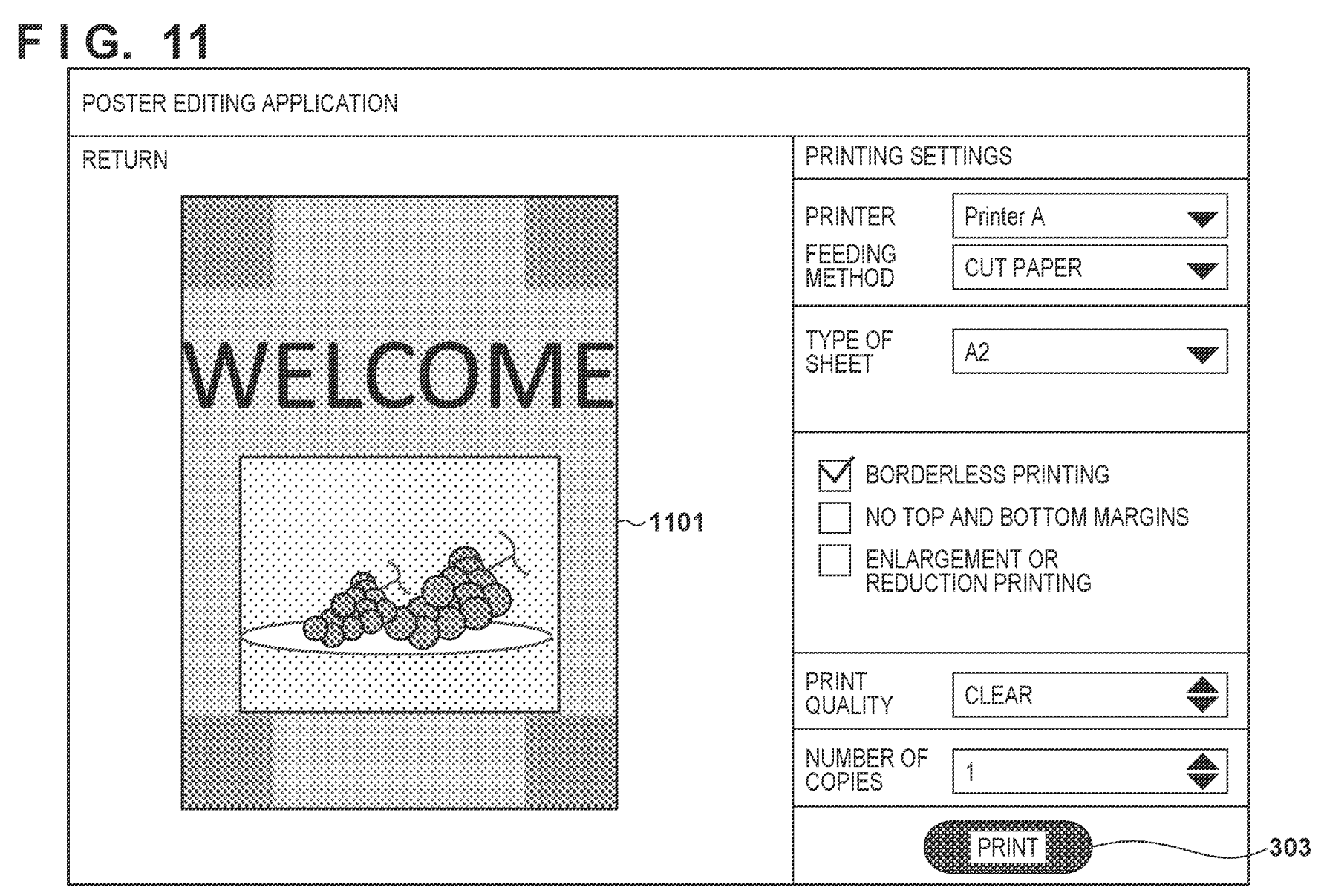

FIG. 11 is a diagram illustrating a print settings screen when the user presses a button 1002 on the screen in FIG. 10. In a print preview 1101, it can be seen that though the printable region of the page region is displayed, the print preview is displayed without characters being cut off.

As described above, according to the present processing example, the objects are rearranged on the basis of information including the type and position of objects and the extend width in the case of borderless printing. Accordingly, a layout in the case of borderless printing can be automatically performed. This removes the need for layout changes to be made by the user taking into account the extend width of each object.

Note that in the present processing example, the scale up processing (step S508) is executed on objects that satisfy the predetermined condition after the scale down processing (step S504) is executed on all predetermined objects. However, in another possible configuration, the scale down processing is executed on only the objects that do not satisfy the predetermined condition. For example, before the scale down processing of step S504, determination processing corresponding to step S506 may be executed and scale down processing may be executed on only the objects (for example, text objects) that do not satisfy the predetermined condition. In other words, using the example of the present embodiment, ultimately, the text object 905 can be fit in the printable region 903 and the shape object 904 can extend into the extend region 902. Then, the internal processing therefor can be changed as appropriate.

Figure 12:
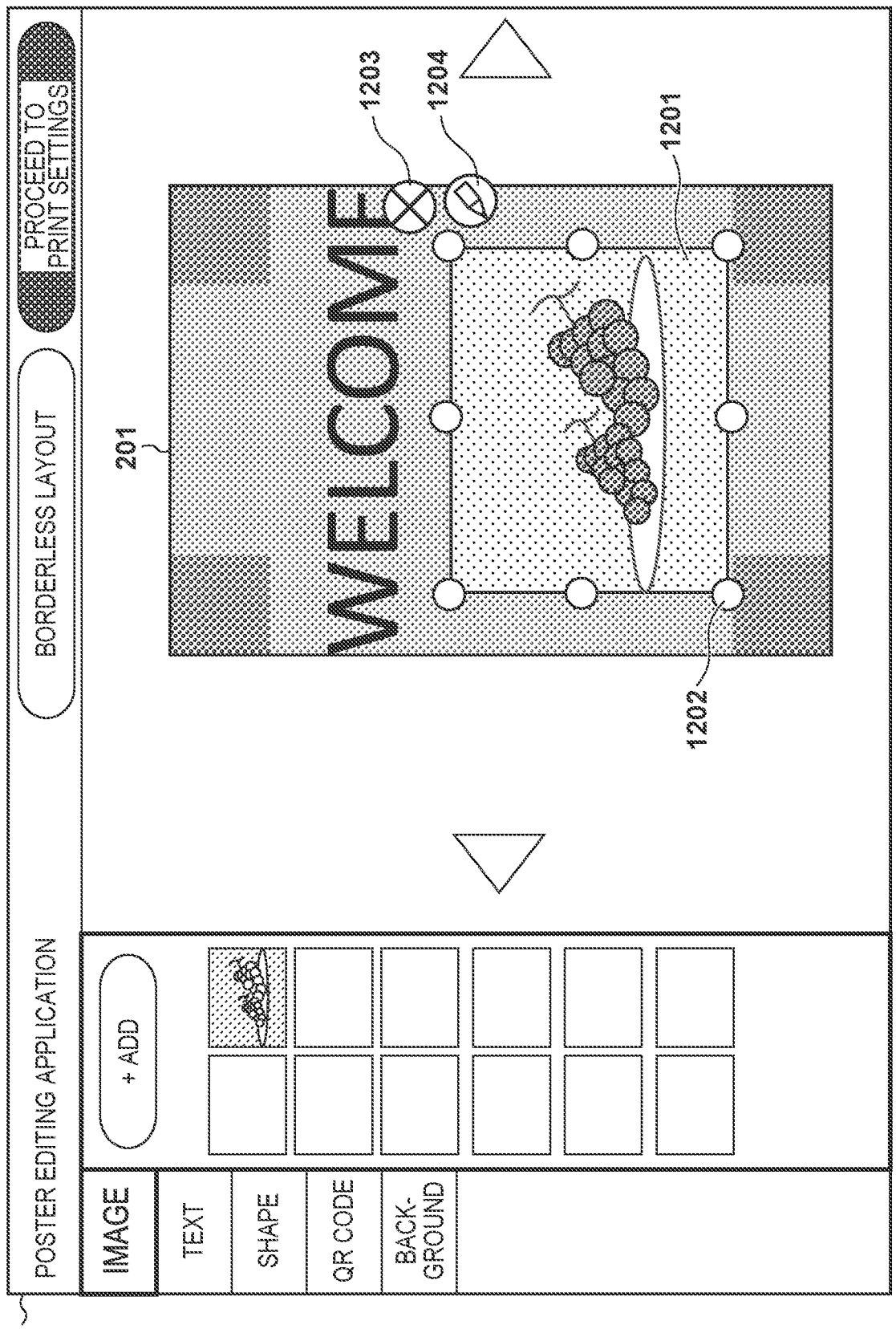
FIG. 12 is a diagram illustrating an example of an editing screen provided by the application.
Figure 13:
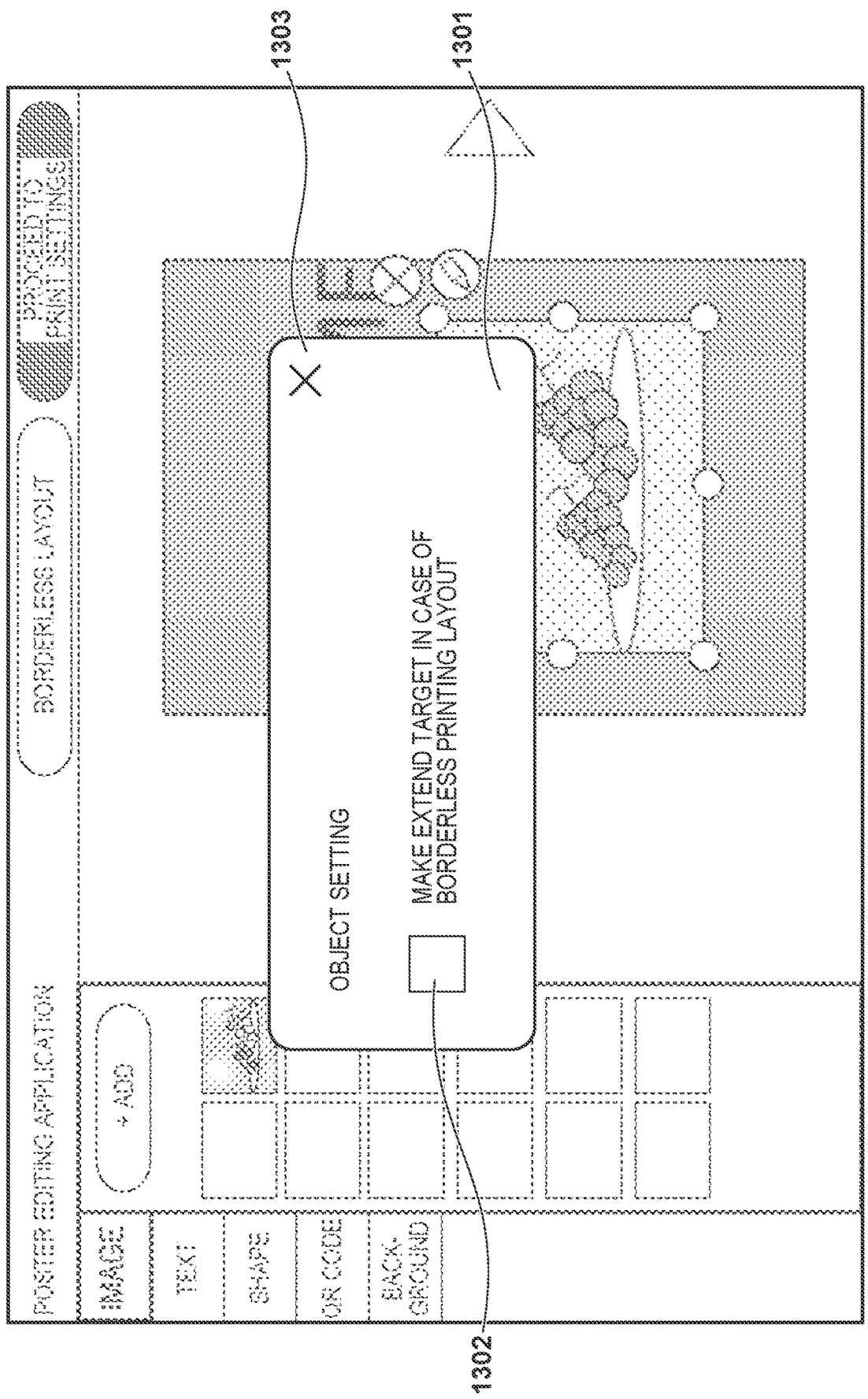
FIG. 13 is a diagram illustrating an example of an editing screen provided by the application.

Second Embodiment (FIGS. 12 and 13)

The present embodiment is different from the first embodiment in terms of the method for determining the type of the object. In the first embodiment, a list (see FIG. 8) of whether or not each object can extend out stored by the application 2 is used in the determination. However, there may be cases where within the same type of object, it is ok for some objects to extend out but it is desirable to suppress some from extending out. For example, with the same shape object, a shape object the user wants to use as a logo mark or the like preferably is not cut off at the edge in the case of borderless printing. The method for the user to set whether or not each object can extend out according to the present embodiment will now be described.

FIG. 12 is a diagram illustrating a display example of when an image object within the page 201 in FIG. 2A is selected.

An image object 1201 is an object that is currently selected in the page 201. A control 1202 is a button for resizing the image object 1201. A button 1203 is a button for deleting the currently selected image object 1201. A button 1204 is a button for the user to set the object settings. FIG. 13 illustrates the screen displayed when the button 1204 is selected.

A dialog 1301 is a dialog for setting the object settings. By a checkbox 1302 being selected by the user, the setting for enabling the image object 1201 to be an extend target in the case of borderless printing can be set. The application 2 may set the default value for this setting on the basis of the list in FIG. 8, for example. A button 1303 is a button for closing the dialog 1301.

In the present embodiment, whether or not the predetermined condition is satisfied is determined in step S506 of FIG. 5 on the basis of the setting value described above. In other words, the predetermined condition includes that the object is set to be allowed to extend into the extend region 602. Thus, the scale up processing of step S508 is executed on the basis of the extend permissibility set by the user, irrespective of the type of the object.

According to the present embodiment, by being able to set the extend permissibility in the case of borderless printing for each object, borderless printing can be performed in accordance with the intention of the user.

Third Embodiment (FIGS. 15 to 18)

Figure 15:
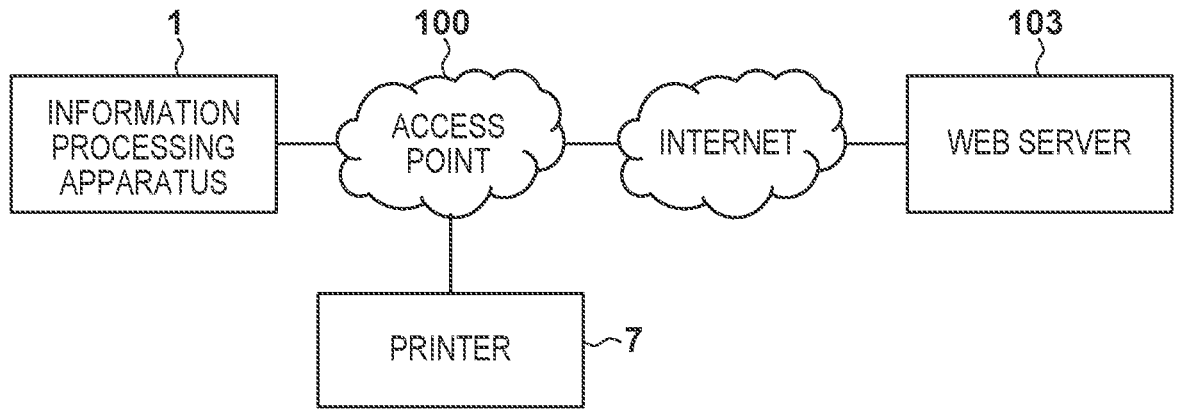
FIG. 15 is a diagram illustrating an example configuration of an information processing system according to an embodiment.

The present invention may be applied to a system that is different from the information processing system described in the first and second embodiments. Specifically, for example, as illustrated in FIG. 15, the information processing system may include a Web server 103. Also, the present invention may be implemented by the program provided from the Web server 103 being used using the Web browser of the information processing apparatus 1. Note that the Web server 103 may be a server system configured of one or more servers. In other words, for example, a plurality of servers may cooperate to function as the solitary Web server 103. As illustrated in FIG. 15, the information processing apparatus 1 can access the Internet via an access point 100. Also, the information processing apparatus 1 can communicate with the Web server 103 via the Internet. The access point 100, for example, is a wireless LAN router and is an external apparatus for enabling access via the Internet to an apparatus connected to the access point 100. As illustrated in FIG. 15, the printer 7 is also connected to the access point 100, and the information processing apparatus 1 communicates with the printer 7 via the access point 100. However, the configuration is not limited thereto, and the information processing apparatus 1 may communicate with the printer 7 bypassing the access point 100. Also, the information processing apparatus 1 may communicate with the Web server 103 bypassing the access point 100 by using a mobile communications network or the like.

Figure 16:
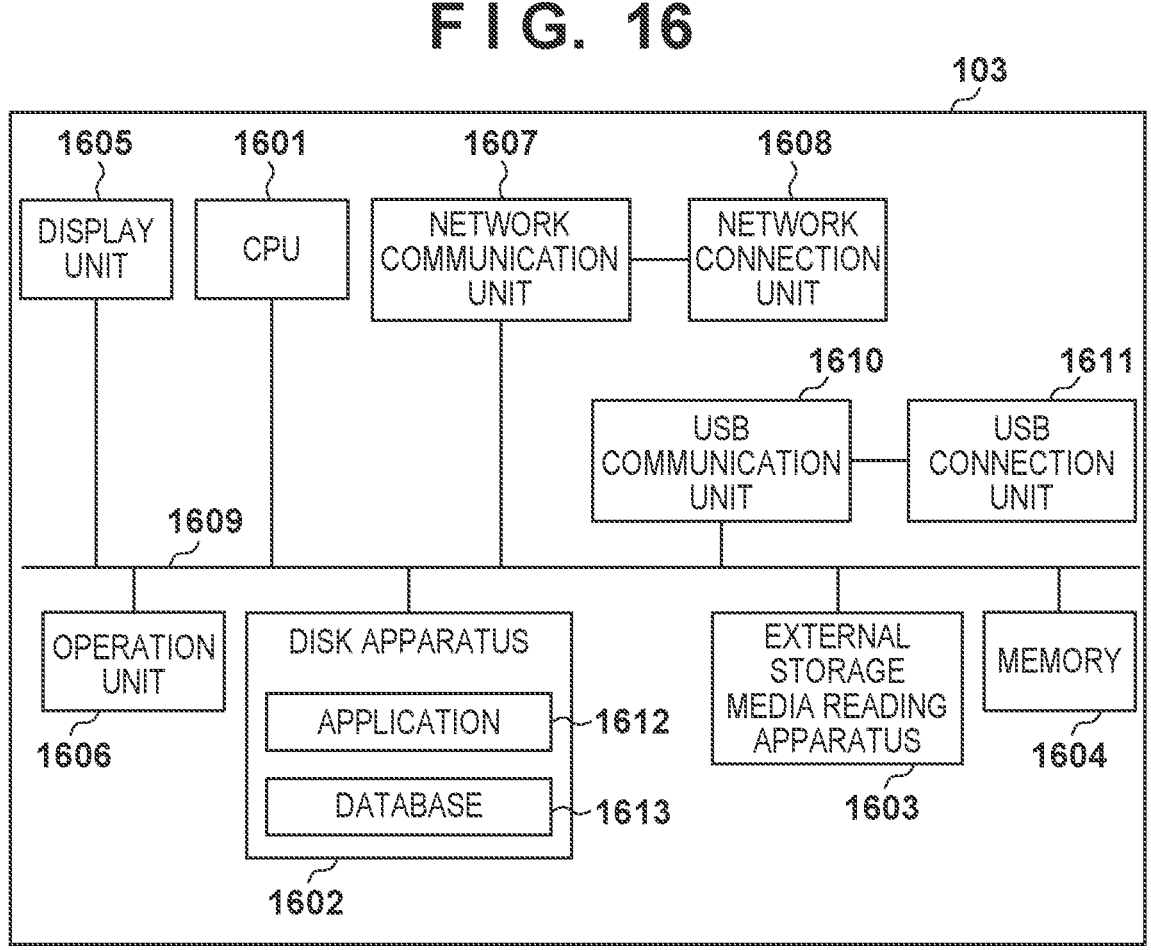
FIG. 16 is a block diagram illustrating an example of the hardware configuration of the Web server.

FIG. 16 is a block diagram illustrating an example of the hardware configuration of the Web server 103. A CPU 1601 is a processor for comprehensively controlling the apparatus. A disk apparatus 1602 stores various types of files including an application program 1612 read out by the CPU 1601, a database 1613, an OS, and the like. An external storage media reading apparatus 1603 is an apparatus for reading out information including files stored on an external storage medium such as an SD card. A memory 1604 is configured of RAM or the like and temporarily stores data, performs buffering, and the like as necessary for the CPU 1601. The operations of the Web server 103 according to the present embodiment are implemented by the CPU 1601 reading out a program stored in the disk apparatus 1602 onto the memory 1604 and executing the program, for example.

A display unit 1605 includes a light-emitting diode (LED) or a liquid crystal display (LCD) and displays a UI screen based on various types of data. An operation unit 1606 includes a keyboard, a mouse, and the like for the user perform various types of input operations. A network communication unit 1607 is connected to a network such as the Internet via a network connection unit 1608 and performs various types of communications. Note that the network communication unit 1607 communicates via wired LAN or wireless LAN, for example. The network connection unit 1608 when the network communication unit 1607 supports wired LAN is a connector for connecting to a wired LAN cable, for example, and the network connection unit 1608 when the network communication unit 1607 supports wireless LAN is an antenna, for example. Note that the network connection unit 1608 may support both wired LAN and wireless LAN. A Universal Serial Bus (USB) communication unit 410 is connected to various types of peripheral apparatuses via a USB connection unit 411 and performs various types of communications according to the USB standards. Also, the units described above are connected to one another via a bus 1609. Note that the Web server 103 may be a server system configured of one or more servers. In other words, for example, a plurality of servers may cooperate to function as the solitary Web server 103.

Figure 17:
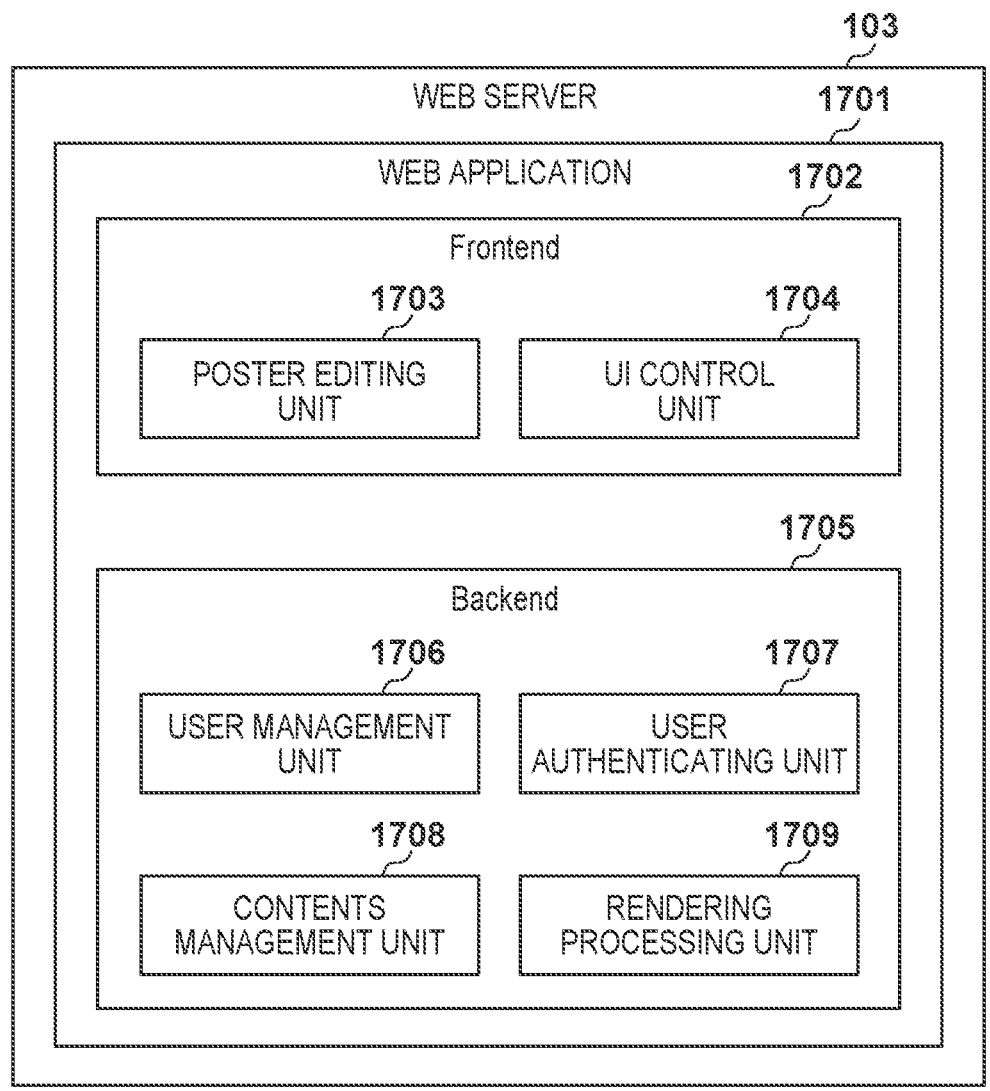
FIG. 17 is a block diagram illustrating an example of the software configuration of the Web server.

FIG. 17 is a block diagram illustrating an example of the software configuration of the Web server 103. A front end 1702 mainly performs display control for the Web browser of the information processing apparatus 1. Specifically, the front end 1702 manages and stores a program (JavaScript) executed in the web browser. More specifically, the front end 1702 manages and stores a program (JavaScript) for executing a user interface (UI) control unit 1704 that controls the user operations of the browser, a creation editing unit 1703 that executes processing to edit a creation generated in an application, and a user authenticating unit 1707 that performs user authentication. Also, the front end 1702 causes a display for the program described above to be displayed on the Web browser of the information processing apparatus 1 by the program being transmitted (downloaded) to the information processing apparatus 1. In other words, when the information processing apparatus 1 receives the program described above, a screen corresponding to the program is displayed on the Web browser using the program. Then, the front end 1702 operates as a program with a poster editing function similar to that of the application 2 according to the first and the second embodiment. In other words, the front end 1702 operates as a program that executes the processing of the flowchart in FIG. 5. Note that the front end 1702 may also be a program with a function for causing the printer 7 to execute printing using spot color ink.

A back end 1705 includes a user management unit 1706, a user authenticating unit 1707, a contents management unit 1708, and a rendering processing unit 1709. The user management unit 1706 manages the user information for identifying users. For example, user information included in cookies is managed. The user authenticating unit 1707 issues a unique identifier for each user associated with the user information. The identifier is account information and is the guest ID described below, for example. The contents management unit 1708 manages the contents including image data and the like generated by the application. The rendering processing unit 1709 executes rendering processing on the contents being managed by the contents management unit 1708. Note that the front end 1702 and the back end 1705 may be stored in different servers.

Figure 18A:
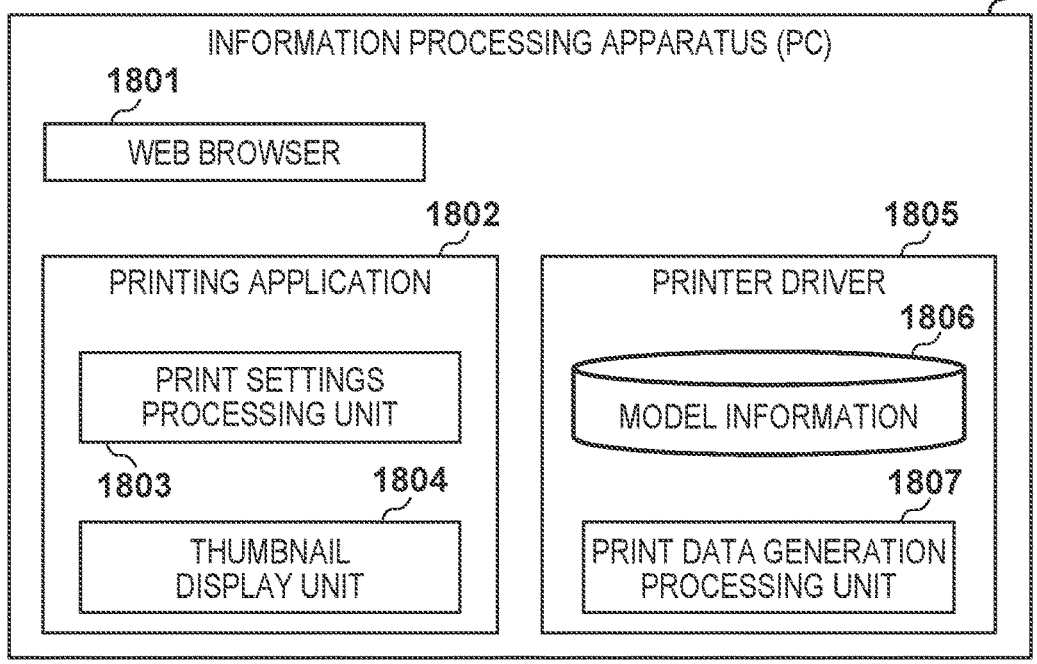
FIGS. 18A and 18B are block diagrams illustrating examples of software configurations of information processing apparatuses.

FIG. 18A is a block diagram illustrating an example of the software configuration when the information processing apparatus 1 is a PC. A Web browser 1801 is a Web browser, and "Internet Explorer", "Microsoft Edge", "Google Chrome", "Firefox", or "Safari" may be used, for example. Note that the information processing apparatus 1 downloads the front end 1702 by the Web browser 1801 using a predetermined URL to access the Web server 103. Then, the front end 1702 is run on the Web browser 1801. In other words, with the front end 1702 downloaded, the front end 1702 is also a part of the software configuration of the information processing apparatus 1.

A printing application 1802 is an application for printing on the basis of the print settings set by the user and includes a print settings processing unit 1803 and a thumbnail display unit 1804. For example, the printing application 1802 is a native application associated with a Web application 1701 and is an application for causing the printing apparatus to print the contents data generated by the Web application 1701. The print settings processing unit 1803 performs print settings. The thumbnail display unit 1804 performs thumbnail display on the basis of the data (poster data) of the poster image generated by the user. In the present embodiment, the printing application 1802 is stored in the information processing apparatus 1 by being downloaded and installed by the information processing apparatus 1 from a server different from the Web server 103. When the information processing apparatus 1 is a PC, the processing for generating print data to be printed by a printing apparatus 102 is executed by a printer driver 1805. Note that the printer driver 1805 is similar to the printer driver 5 according to the first and second embodiment. The printer driver 1805 includes printer model information 1806 and print data generation processing unit 1807. The model information 1806 stores information relating to the settings that can be used for printing for each printer and the like. Information relating to the settings that can be used includes the setting value for the feeding method, the type of sheet, and the like.

Figure 18B:
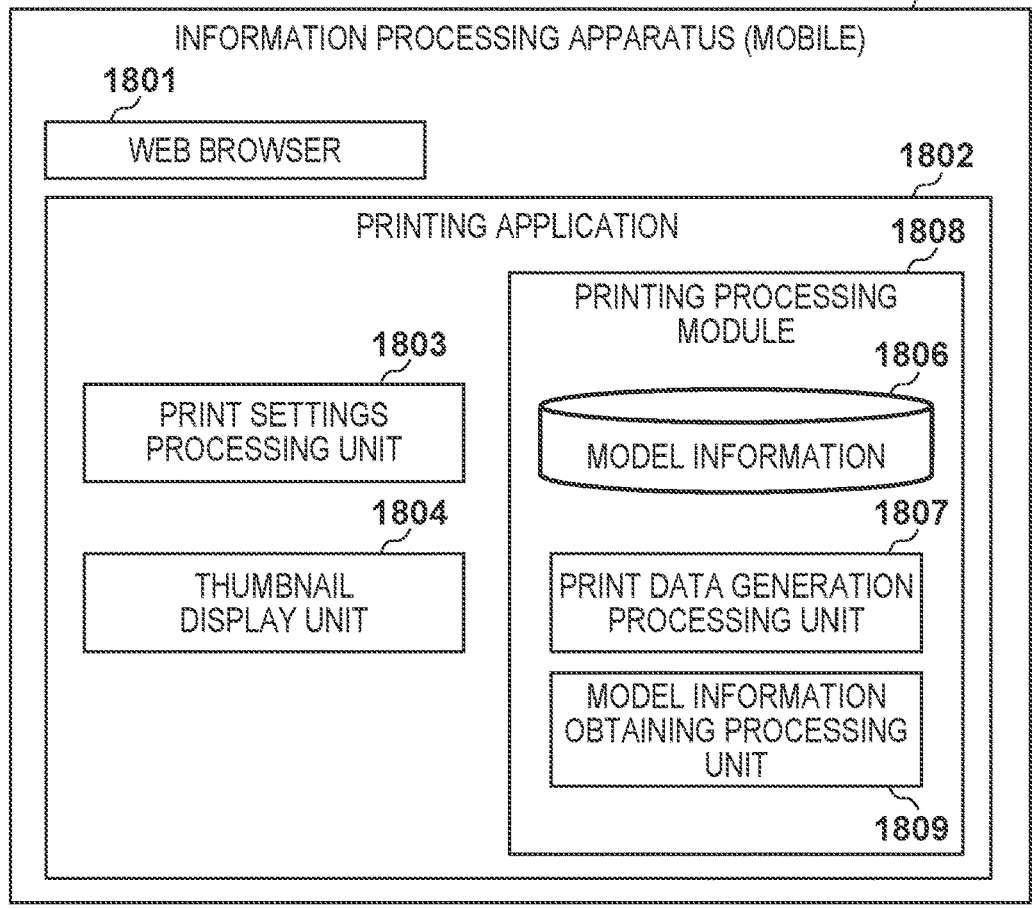

FIG. 18B is a block diagram illustrating an example of the software configuration when the information processing apparatus 1 is a mobile terminal. The differences with FIG. 18A will be described below. When the information processing apparatus 1 is a mobile terminal, the printer driver 1805 is not provided. Accordingly, the information processing apparatus 1 includes a printing processing module 1808 that executes print data generation processing. The printing processing module 1808 includes a model information obtaining processing unit 1809. The model information obtaining processing unit 1809 obtains the model information 1806 from the printing apparatus 102. Note that the obtained model information 1806 is stored in an external storage apparatus (not illustrated), for example.

In such an information processing system, the user generates a poster image on the screen displayed on the Web browser 1801 of the information processing apparatus 1 by the front end 1702. At this time, the screens illustrated in FIGS. 2A to 4 and 10 to 13 may be displayed by the front end 1702 on the Web browser 1801. Also, the processing illustrated in the flowchart in FIG. 5 may be executed by the front end 1702. The generated poster image is printed on a printing medium using the printing application 1802.

Other Embodiments

In the embodiments described above, a terminal apparatus such as a personal computer is used as the information processing apparatus. However, in other embodiments, a different apparatus can be used. For example, a smartphone, a tablet, a printer or a similar image processing apparatus, an Internet KIOSK terminal, or the like may be used. Alternatively, the information processing apparatus may be a server of the like that can communicate with a terminal apparatus owned by the user via a network. When the information processing apparatus is a server, for example, from among the items of processing of the application 2, processing relating to screen display may be executed by the terminal apparatus owned by the user.

In the embodiments described above, a poster generating application is used as an example, but no such limitation is intended. For example, advantages of the embodiments described above can be applied to an application or the like for generating or editing pamphlets, business cards, photo albums, and the like.

Embodiment(s) of the present invention can also be realized by one or more computers of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-139344, filed Sep. 1, 2022, which is hereby incorporated by reference herein in its entirety.

What is claimed is:

1. A non-transitory computer-readable storage medium storing one or more programs configured to cause one or more computers to function as:
   a receiving unit configured to receive an instruction for a re-layout for borderless printing of one or more objects included in a page that can be printed by a printing apparatus; and
   a re-layout unit configured to execute re-layout processing of the one or more objects when the instruction is received by the receiving unit, the re-layout processing including at least processing to scale down a predetermined object that does not satisfy a predetermined condition relative to a background object so that, for objects other than the background object from among the one or more objects, an object that satisfies the predetermined condition is allowed to extend into, from among a printable region and an extend region in the page in a case of borderless printing, the extend region and an object that does not satisfy the predetermined condition is not allowed to extend into the extend region.

2. The storage medium storing one or more programs according to claim 1, wherein
   the computer is further caused to function as an obtaining unit configured to obtain a printable region and an extend region in the page in a case of borderless printing when the instruction is received by the receiving unit, and
   the re-layout unit executes the re-layout processing on a basis of information obtained by the obtaining unit.

3. The storage medium storing one or more programs according to claim 1, wherein
   the re-layout unit performs a re-layout processing of the one or more objects by changing a position or size of the one or more objects.

4. The storage medium storing one or more programs according to claim 1, wherein
   via the re-layout processing
   an object other than a background object from among the one or more objects that does not satisfy the predetermined condition is scaled at a first scaling ratio to fit in the printable region, and
   a specific object other than a background object from among the one or more objects that does satisfy the predetermined condition is scaled at a second scaling ratio that produces a result larger than scaling at the first scaling ratio to extend into the extend region.

5. The storage medium storing one or more programs according to claim 4, wherein
   the specific object is an object that satisfies the predetermined condition and has a predetermined positional relationship with a periphery of the printable region.

6. The storage medium storing one or more programs according to claim 5, wherein
   the predetermined positional relationship is a positional relationship in which an object borders the periphery of the printable region.

7. The storage medium storing one or more programs according to claim 1, wherein
   the re-layout processing includes scale down processing to scale down an object other than a background object from among the one or more objects to fit in the printable region and scale up processing to scale up to the extend region a specific object from among scaled down objects that satisfies the predetermined condition.

8. The storage medium storing one or more programs according to claim 7, wherein
   in the re-layout processing, the scale down processing is not executed for an object from among the one or more objects that extends beyond the extend region before a re-layout even if the object is an object other than the background object.

9. The storage medium storing one or more programs according to claim 1, wherein
   the predetermined condition is a condition based on whether an object type is one of a plurality of types including image, text, and shape.

10. The storage medium storing one or more programs according to claim 9, wherein when an object type is text, the predetermined condition is not satisfied.

11. The storage medium storing one or more programs according to claim 9, wherein
when an object type is image and a face image is included, the predetermined condition is not satisfied.

12. The storage medium storing one or more programs according to claim 9, wherein
the predetermined condition is a condition based on information including object type and extend permissibility associated together.

13. The storage medium storing one or more programs according to claim 1, wherein
the computer is further caused to function as a setting unit configured to set extend permissibility for the one or more objects, and
the predetermined condition is a condition based on content set by the setting unit.

14. An information processing apparatus comprising:
at least one memory and at least one processor which function as:
a receiving unit configured to receive an instruction for a re-layout for borderless printing of one or more objects included in a page that can be printed by a printing apparatus, and
a re-layout unit configured to execute re-layout processing of the one or more objects when the instruction is received by the receiving unit, the re-layout processing including at least processing to scale down a predetermined object that does not satisfy a predetermined condition relative to a background object so that, for objects other than the background object from among the one or more objects, an object that satisfies the predetermined condition is allowed to extend into, from among a printable region and a extend region in the page in a case of borderless printing, the extend region and an object that does not satisfy the predetermined condition is not allowed to extend into the extend region.

15. A control method executed in an information processing apparatus, the method comprising:
receiving an instruction for a re-layout for borderless printing of one or more objects included in a page that can be printed by a printing apparatus; and
executing re-layout processing of the one or more objects when the instruction is received by the receiving, the re-layout processing including at least processing to scale down a predetermined object that does not satisfy a predetermined condition relative to a background object so that, for objects other than the background object from among the one or more objects, an object that satisfies the predetermined condition is allowed to extend into, from among a printable region and an extend region in the page in a case of borderless printing, the extend region and an object that does not satisfy the predetermined condition is not allowed to extend into the extend region.

* * * * *